US012810475B2

(12) United States Patent
Dong

(10) Patent No.: US 12,810,475 B2
(45) Date of Patent: Nov. 24, 2026

(54) COLOR DETERMINATION APPARATUS, COLOR DETERMINATION METHOD, AND NON-TRANSITORY COMPUTER-READABLE MEDIUM

(71) Applicant: NEC Corporation, Tokyo (JP)

(72) Inventor: Tingting Dong, Tokyo (JP)

(73) Assignee: NEC CORPORATION, Tokyo (JP)

( * ) Notice: Subject to any disclaimer, the term of this patent is extended or adjusted under 35 U.S.C. 154(b) by 337 days.

(21) Appl. No.: 18/562,469

(22) PCT Filed: May 28, 2021

(86) PCT No.: PCT/JP2021/020564

§ 371 (c)(1),
(2) Date: Nov. 20, 2023

(87) PCT Pub. No.: WO2022/249491

PCT Pub. Date: Dec. 1, 2022

(65) Prior Publication Data

US 2024/0242385 A1 Jul. 18, 2024

(51) Int. Cl.
*G06T 7/90* (2017.01)
*G06F 16/532* (2019.01)
(Continued)

(52) U.S. Cl.
CPC .............. *G06T 7/90* (2017.01); *G06F 16/532* (2019.01); *G06F 16/5838* (2019.01);
(Continued)

(58) Field of Classification Search
CPC ............. G06T 7/90; G06T 2207/10024; G06T 2207/20092; G06F 16/532; G06F 16/5838;
(Continued)

(56) References Cited

U.S. PATENT DOCUMENTS

2003/0021481 A1* 1/2003 Kasutani ............... G06F 16/583 707/E17.02
2006/0072829 A1* 4/2006 Cieplinski ........... G06F 16/5838 382/224

(Continued)

FOREIGN PATENT DOCUMENTS

JP H07-73195 A 3/1995
JP 2003-036273 A 2/2003

(Continued)

OTHER PUBLICATIONS

JP Official Communication for JP Application No. 2023-523942, mailed on Jul. 16, 2024 with English Translation.

(Continued)

*Primary Examiner* — Sumati Lefkowitz
*Assistant Examiner* — Aaron Joseph Sorrin

(57) ABSTRACT

A color determination apparatus according to one example embodiment of this disclosure includes: at least one memory configured to store instructions; and at least one processor configured to execute the instructions to: extract a first color feature value from an image based on color space information defining a color space, the first color feature value being a feature value with regard to a color of the image; convert a user's specified color to a second color feature value based on the color space information and a probability distribution model expressing color ambiguity, the second color feature value being a feature value with regard to the specified color; and calculate a degree of similarity between the first color feature value and the second color feature value.

17 Claims, 21 Drawing Sheets

20'

(51) Int. Cl.

| | |
|---|---|
| ***G06F 16/583*** | (2019.01) |
| ***G06V 10/56*** | (2022.01) |
| ***G06V 10/74*** | (2022.01) |
| ***G06V 10/776*** | (2022.01) |
| ***G06V 10/94*** | (2022.01) |

(52) U.S. Cl.
CPC ............ *G06V 10/56* (2022.01); *G06V 10/761* (2022.01); *G06V 10/776* (2022.01); *G06V 10/945* (2022.01); *G06T 2207/10024* (2013.01); *G06T 2207/20092* (2013.01)

(58) Field of Classification Search
CPC .... G06V 10/56; G06V 10/761; G06V 10/776; G06V 10/945; H04N 1/62

See application file for complete search history.

(56) References Cited

U.S. PATENT DOCUMENTS

| | | | | |
|---|---|---|---|---|
| 2008/0046409 | A1* | 2/2008 | Lieb | G06F 16/5838 |
| 2010/0158412 | A1* | 6/2010 | Wang | G06V 20/00 382/305 |
| 2014/0241625 | A1 | 8/2014 | Suzuki | |
| 2015/0332479 | A1* | 11/2015 | Gershon | G06T 7/11 382/164 |

FOREIGN PATENT DOCUMENTS

| | | | |
|---|---|---|---|
| JP | 2014-164656 | A | 9/2014 |
| WO | 2013/005262 | A1 | 1/2013 |
| WO | 2020/050354 | A1 | 3/2020 |

OTHER PUBLICATIONS

International Search Report for PCT Application No. PCT/JP2021/020564, mailed on Jul. 20, 2021.

* cited by examiner

| H(deg) | Area |
|---|---|
| $(0, 360/n_h]$ | H1 |
| $(360/n_h, 2*360/n_h]$ | H2 |
| … | … |
| $((n_h-1)*360/n_h, 360]$ | $Hn_h$ |

Fig. 5A

| S | Area |
|---|---|
| $[0, 1/n_s]$ | S1 |
| $(1/n_s, 2/n_s]$ | S2 |
| … | … |
| $((n_s-1)/n_s, 1]$ | $Sn_s$ |

Fig. 5B

| V | Area |
|---|---|
| $[0, 1/n_v]$ | V1 |
| $(1/n_v, 2/n_v]$ | V2 |
| … | … |
| $((n_v\text{-}1)/n_v, 1]$ | $Vn_v$ |

Fig. 5C

H(deg) 0 20 40 180 200 220 240 320 340 360

| | | H1 | H2 | … | H10 | H11 | H12 | … | H17 | H18 |
|---|---|---|---|---|---|---|---|---|---|---|
| s(0. 75, 1], v(0. 75, 1] | SV1 | 0 | 0 | … | 0 | 0 | 0 | … | 0 | 0 |
| | … | … | … | … | … | … | … | … | … | … |
| s(0. 75, 1], v[0, 0. 25] | SV13 | 0 | 0 | … | 0 | 0 | 0 | … | 0 | 0 |
| | … | … | … | … | … | … | … | … | … | … |
| s[0, 0. 25], v[0, 0. 25] | SV16 | 0 | 0 | … | 0 | 0 | 0 | … | 0 | 0 |

Fig. 6A

| | H1 | H2 | H3 | H4 | H5 | H6 | H7 | H8 | H9 |
|---|---|---|---|---|---|---|---|---|---|
| H(deg) | (0,20] | (20,40] | (40,60] | (60,80] | (80,100] | (100,120] | (120,140] | (140,160] | (160,180] |

| | H10 | H11 | H12 | H13 | H14 | H15 | H16 | H17 | H18 |
|---|---|---|---|---|---|---|---|---|---|
| H(deg) | (180,200] | (200,220] | (220,240] | (240,260] | (260,280] | (280,300] | (300,320] | (320,340] | (340,360] |

Fig. 6B

| | |
|---|---|
| **SV1** | s(0.75, 1], v(0.75, 1] |
| **SV2** | s(0.5, 0.75], v(0.75, 1] |
| **SV3** | s(0.25, 0.5], v(0.75, 1] |
| **SV4** | s[0, 0.25], v(0.75, 1] |
| **SV5** | s(0.75, 1], v(0.5, 0.75] |
| **SV6** | s(0.5, 0.75], v(0.5, 0.75] |
| **SV7** | s(0.25, 0.5], v(0.5, 0.75] |
| **SV8** | s[0, 0.25], v(0.5, 0.75] |
| **SV9** | s(0.75, 1], v(0.25, 0.5] |
| **SV10** | s(0.5, 0.75], v(0.25, 0.5] |
| **SV11** | s(0.25, 0.5], v(0.25, 0.5] |
| **SV12** | s[0, 0.25], v(0.25, 0.5] |
| **SV13** | s(0.75, 1], v[0, 0.25] |
| **SV14** | s(0.5, 0.75], v[0, 0.25] |
| **SV15** | s(0.25, 0.5], v[0, 0.25] |
| **SV16** | s[0, 0.25], v[0, 0.25] |

Fig. 6C

H(deg) 0 20 40 180 200 220 240 320 340 360

| | | H1 | H2 | … | H10 | H11 | H12 | … | H17 | H18 |
|---|---|---|---|---|---|---|---|---|---|---|
| s(0.75, 1], v(0.75, 1] | SV1 | 0 | 0 | … | 0 | 0 | 0 | … | 0 | 0 |
| | … | … | … | … | … | … | … | … | … | … |
| s(0.75, 1], v[0, 0.25] | SV13 | 0 | 0 | … | 0 | 0 | 1 | … | 0 | 0 |
| | … | … | … | … | … | … | … | … | … | … |
| s[0, 0.25], v[0, 0.25] | SV16 | 0 | 0 | … | 0 | 0 | 0 | … | 0 | 0 |

Fig. 6D

| H | S | V | Color | Case |
|---|---|---|---|---|
| [0, 360] | [0.14, 1] | [0.19, 1] | (4) Other | **Case D** |
| [0, 360] | [0, 0.14) | (0.81, 1] | (3) White | **Case B** |
| | | [0.19, 0.81] | (2) Gray | **Case C** |
| | [0, 1] | [0, 0.19) | (1) Black | **Case A** |

| | H1 | H2 | H3 | H4 | H5 | H6 | H7 | H8 | H9 | … | H18 |
|---|---|---|---|---|---|---|---|---|---|---|---|
| SV1 | 0 | 0 | 0 | 0 | 0 | 0 | 0 | 0 | 0 | … | 0 |
| SV2 | 0 | 0 | 0 | 0 | 0 | 0 | 0 | 0 | 0 | … | 0 |
| SV3 | 0 | 0 | 0 | 0 | 0 | 0 | 0 | 0 | 0 | … | 0 |
| … | … | … | … | … | … | … | … | … | … | … | … |
| SV13 | 0.75 | 0.75 | 0.75 | 0.75 | 0.75 | 0.75 | 0.75 | 0.75 | 0.75 | … | 0.75 |
| SV14 | 0.88 | 0.88 | 0.88 | 0.88 | 0.88 | 0.88 | 0.88 | 0.88 | 0.88 | … | 0.88 |
| SV15 | 0.97 | 0.97 | 0.97 | 0.97 | 0.97 | 0.97 | 0.97 | 0.97 | 0.97 | … | 0.97 |
| SV16 | 1 | 1 | 1 | 1 | 1 | 1 | 1 | 1 | 1 | … | 1 |

B1 B2

Fig. 9A

| | H1 | H2 | H3 | H4 | H5 | H6 | H7 | H8 | H9 | … | H18 |
|---|---|---|---|---|---|---|---|---|---|---|---|
| SV1 | 0 | 0 | 0 | 0 | 0 | 0 | 0 | 0 | 0 | … | 0 |
| SV2 | 0 | 0 | 0 | 0 | 0 | 0 | 0 | 0 | 0 | … | 0 |
| SV3 | 0 | 0 | 0 | 0 | 0 | 0 | 0 | 0 | 0 | … | 0 |
| … | … | … | … | … | … | … | … | … | … | … | … |
| SV13 | 1 | 0.99 | 0.98 | 0.95 | 0.91 | 0.86 | 0.80 | 0.74 | 0.67 | … | 0.99 |
| SV14 | 0.97 | 0.96 | 0.95 | 0.92 | 0.88 | 0.83 | 0.78 | 0.72 | 0.65 | … | 0.96 |
| SV15 | 0.88 | 0.87 | 0.86 | 0.84 | 0.80 | 0.76 | 0.70 | 0.65 | 0.59 | … | 0.87 |
| SV16 | 0.75 | 0.74 | 0.74 | 0.71 | 0.68 | 0.65 | 0.60 | 0.56 | 0.50 | … | 0.74 |

B3 B4

Fig. 9B

B5, B6

| | H1 | H2 | H3 | H4 | H5 | H6 | H7 | H8 | H9 | … | H18 |
|---|---|---|---|---|---|---|---|---|---|---|---|
| SV1 | 0 | 0 | 0 | 0 | 0 | 0 | 0 | 0 | 0 | … | 0 |
| SV2 | 0 | 0 | 0 | 0 | 0 | 0 | 0 | 0 | 0 | … | 0 |
| SV3 | 0 | 0 | 0 | 0 | 0 | 0 | 0 | 0 | 0 | … | 0 |
| *SV4* | *1* | *1* | *1* | *1* | *1* | *1* | *1* | *1* | *1* | … | *1* |
| … | … | … | … | … | … | … | … | … | … | … | … |
| SV14 | 0 | 0 | 0 | 0 | 0 | 0 | 0 | 0 | 0 | … | 0 |
| SV15 | 0 | 0 | 0 | 0 | 0 | 0 | 0 | 0 | 0 | … | 0 |
| SV16 | 0 | 0 | 0 | 0 | 0 | 0 | 0 | 0 | 0 | … | 0 |

Fig. 10A

B7 B8

| | H1 | H2 | H3 | H4 | H5 | H6 | H7 | H8 | H9 | … | H18 |
|---|---|---|---|---|---|---|---|---|---|---|---|
| SV1 | 0 | 0 | 0 | 0 | 0 | 0 | 0 | 0 | 0 | … | 0 |
| SV2 | 0 | 0 | 0 | 0 | 0 | 0 | 0 | 0 | 0 | … | 0 |
| SV3 | 0 | 0 | 0 | 0 | 0 | 0 | 0 | 0 | 0 | … | 0 |
| *SV4* | *1* | *0.99* | *0.98* | *0.95* | *0.91* | *0.86* | *0.80* | *0. 74* | *0. 67* | … | *0.99* |
| … | … | … | … | … | … | … | … | … | … | … | … |
| SV14 | 0 | 0 | 0 | 0 | 0 | 0 | 0 | 0 | 0 | … | 0 |
| SV15 | 0 | 0 | 0 | 0 | 0 | 0 | 0 | 0 | 0 | … | 0 |
| SV16 | 0 | 0 | 0 | 0 | 0 | 0 | 0 | 0 | 0 | … | 0 |

Fig. 10B

B9 B10

| | H1 | H2 | H3 | H4 | H5 | H6 | H7 | H8 | H9 | … | H18 |
|---|---|---|---|---|---|---|---|---|---|---|---|
| SV1 | 0 | 0 | 0 | 0 | 0 | 0 | 0 | 0 | 0 | … | 0 |
| … | … | … | … | … | … | … | … | … | … | … | … |
| SV4 | 0.61 | 0.61 | 0.61 | 0.61 | 0.61 | 0.61 | 0.61 | 0.61 | 0.61 | … | 0.61 |
| … | … | … | … | … | … | … | … | … | … | … | … |
| SV8 | 1 | 1 | 1 | 1 | 1 | 1 | 1 | 1 | 1 | … | 1 |
| … | … | … | … | … | … | … | … | … | … | … | … |
| SV12 | 0.61 | 0.61 | 0.61 | 0.61 | 0.61 | 0.61 | 0.61 | 0.61 | 0.61 | … | 0.61 |
| … | … | … | … | … | … | … | … | … | … | … | … |
| SV16 | 0.14 | 0.14 | 0.14 | 0.14 | 0.14 | 0.14 | 0.14 | 0.14 | 0.14 | … | 0.14 |

Fig. 11A

| | H1 | H2 | H3 | H4 | H5 | H6 | H7 | H8 | H9 | … | H18 |
|---|---|---|---|---|---|---|---|---|---|---|---|
| SV1 | 0 | 0 | 0 | 0 | 0 | 0 | 0 | 0 | 0 | … | 0 |
| … | … | … | … | … | … | … | … | … | … | … | … |
| SV4 | 0.14 | 0.13 | 0.13 | 0.13 | 0.12 | 0.12 | 0.11 | 0.10 | 0.09 | … | 0.13 |
| … | … | … | … | … | … | … | … | … | … | … | … |
| SV8 | 0.61 | 0.60 | 0.60 | 0.58 | 0.56 | 0.52 | 0.49 | 0.45 | 0.41 | … | 0.60 |
| … | … | … | … | … | … | … | … | … | … | … | … |
| SV12 | 1 | 0.99 | 0.98 | 0.95 | 0.91 | 0.86 | 0.80 | 0.74 | 0.67 | … | 0.99 |
| … | … | … | … | … | … | … | … | … | … | … | … |
| SV16 | 0.61 | 0.60 | 0.60 | 0.58 | 0.56 | 0.52 | 0.49 | 0.45 | 0.41 | … | 0.60 |

B12

B11

Fig. 11B

| | H1 | H2 | H3 | *H4* | *H5* | *H6* | *H7* | *H8* | H9 | … | H18 |
|---|---|---|---|---|---|---|---|---|---|---|---|
| SV1 | 0 | 0 | 0 | *0.24* | *0.26* | *0.29* | *0.28* | *0.24* | 0 | … | 0 |
| … | … | … | … | … | … | … | … | … | … | … | … |
| SV4 | 0 | 0 | 0 | *0.74* | *0.81* | *0.88* | *0.87* | *0.74* | 0 | … | 0 |
| … | … | … | … | … | … | … | … | … | … | … | … |
| SV8 | 0 | 0 | 0 | *0.84* | *0.92* | *1* | *0.98* | *0.84* | 0 | … | 0 |
| … | … | … | … | … | … | … | … | … | … | … | … |
| SV13 | 0 | 0 | 0 | *0.09* | *0.10* | *0.11* | *0.10* | *0.09* | 0 | … | 0 |
| … | … | … | … | … | … | … | … | … | … | … | … |
| SV16 | 0 | 0 | 0 | *0.27* | *0.30* | *0.32* | *0.32* | *0.27* | 0 | … | 0 |

B14 B13

Fig. 12A

B17

| | H1 | H2 | H3 | *H4* | *H5* | *H6* | *H7* | *H8* | H9 | … | H18 |
|---|---|---|---|---|---|---|---|---|---|---|---|
| SV1 | 0 | 0 | *0.24* | *0.28* | *0.29* | *0.26* | *0.24* | 0 | 0 | … | 0 |
| … | … | … | … | … | … | … | … | … | … | … | … |
| SV4 | 0 | 0 | *0.74* | *0.87* | *0.88* | *0.81* | *0.74* | 0 | 0 | … | 0 |
| … | … | … | … | … | … | … | … | … | … | … | … |
| SV8 | 0 | 0 | *0.84* | *0.98* | *1* | *0.92* | *0.84* | 0 | 0 | … | 0 |
| … | … | … | … | … | … | … | … | … | … | … | … |
| SV13 | 0 | 0 | *0.09* | *0.10* | *0.11* | *0.10* | *0.09* | 0 | 0 | … | 0 |
| … | … | … | … | … | … | … | … | … | … | … | … |
| SV16 | 0 | 0 | *0.27* | *0.32* | *0.32* | *0.30* | *0.27* | 0 | 0 | … | 0 |

B16 B15

Fig. 12B

| | H1 | H2 | H3 | H4 | H5 | H6 | H7 | H8 | H9 | H10 | H11 | H12 | H13 | H14 | H15 | H16 | H17 | H18 |
|---|---|---|---|---|---|---|---|---|---|---|---|---|---|---|---|---|---|---|
| SV1 | 0.779 | 0 | 0 | 0 | 0 | 0 | 0 | 0 | 0 | 0 | 0 | 0 | 0 | 0 | 0 | 0 | 0 | 0.687 |
| SV2 | 0.882 | 0 | 0 | 0 | 0 | 0 | 0 | 0 | 0 | 0 | 0 | 0 | 0 | 0 | 0 | 0 | 0 | 0.779 |
| SV3 | 0.779 | 0 | 0 | 0 | 0 | 0 | 0 | 0 | 0 | 0 | 0 | 0 | 0 | 0 | 0 | 0 | 0 | 0.687 |
| SV4 | 0.287 | 0 | 0 | 0 | 0 | 0 | 0 | 0 | 0 | 0 | 0 | 0 | 0 | 0 | 0 | 0 | 0 | 0.253 |
| SV5 | 0.882 | 0 | 0 | 0 | 0 | 0 | 0 | 0 | 0 | 0 | 0 | 0 | 0 | 0 | 0 | 0 | 0 | 0.779 |
| SV6 | 1 | 0 | 0 | 0 | 0 | 0 | 0 | 0 | 0 | 0 | 0 | 0 | 0 | 0 | 0 | 0 | 0 | 0.882 |
| SV7 | 0.882 | 0 | 0 | 0 | 0 | 0 | 0 | 0 | 0 | 0 | 0 | 0 | 0 | 0 | 0 | 0 | 0 | 0.779 |
| SV8 | 0.325 | 0 | 0 | 0 | 0 | 0 | 0 | 0 | 0 | 0 | 0 | 0 | 0 | 0 | 0 | 0 | 0 | 0.287 |
| SV9 | 0.779 | 0 | 0 | 0 | 0 | 0 | 0 | 0 | 0 | 0 | 0 | 0 | 0 | 0 | 0 | 0 | 0 | 0.687 |
| SV10 | 0.882 | 0 | 0 | 0 | 0 | 0 | 0 | 0 | 0 | 0 | 0 | 0 | 0 | 0 | 0 | 0 | 0 | 0.779 |
| SV11 | 0.779 | 0 | 0 | 0 | 0 | 0 | 0 | 0 | 0 | 0 | 0 | 0 | 0 | 0 | 0 | 0 | 0 | 0.687 |
| SV12 | 0.287 | 0 | 0 | 0 | 0 | 0 | 0 | 0 | 0 | 0 | 0 | 0 | 0 | 0 | 0 | 0 | 0 | 0.253 |
| SV13 | 0.287 | 0 | 0 | 0 | 0 | 0 | 0 | 0 | 0 | 0 | 0 | 0 | 0 | 0 | 0 | 0 | 0 | 0.253 |
| SV14 | 0.325 | 0 | 0 | 0 | 0 | 0 | 0 | 0 | 0 | 0 | 0 | 0 | 0 | 0 | 0 | 0 | 0 | 0.287 |
| SV15 | 0.287 | 0 | 0 | 0 | 0 | 0 | 0 | 0 | 0 | 0 | 0 | 0 | 0 | 0 | 0 | 0 | 0 | 0.253 |
| SV16 | 0.105 | 0 | 0 | 0 | 0 | 0 | 0 | 0 | 0 | 0 | 0 | 0 | 0 | 0 | 0 | 0 | 0 | 0.093 |

Fig. 13A

| | H1 | H2 | H3 | H4 | H5 | H6 | H7 | H8 | H9 | H10 | H11 | H12 | H13 | H14 | H15 | H16 | H17 | H18 |
|---|---|---|---|---|---|---|---|---|---|---|---|---|---|---|---|---|---|---|
| SV1 | 0 | 0 | 0 | 0 | 0 | 0 | 0 | 0 | 0 | 0 | 0 | 0 | 0 | 0 | 0 | 0 | 0 | 0 |
| SV2 | 0 | 0 | 0 | 0 | 0 | 0 | 0 | 0 | 0 | 0 | 0 | 0 | 0 | 0 | 0 | 0 | 0 | 0 |
| SV3 | 0 | 0 | 0 | 0 | 0 | 0 | 0 | 0 | 0 | 0 | 0 | 0 | 0 | 0 | 0 | 0 | 0 | 0 |
| SV4 | 0.011 | 0 | 0 | 0 | 0 | 0 | 0 | 0 | 0.005 | 0.002 | 0.004 | 0.004 | 0.019 | 0.028 | 0.013 | 0.13 | 0 | 0 |
| SV5 | 0 | 0 | 0 | 0 | 0 | 0 | 0 | 0 | 0 | 0 | 0 | 0 | 0 | 0 | 0 | 0 | 0 | 0.145 |
| SV6 | 0 | 0 | 0 | 0 | 0 | 0 | 0 | 0 | 0 | 0 | 0 | 0 | 0 | 0 | 0 | 0 | 0.005 | 0.172 |
| SV7 | 0 | 0 | 0 | 0 | 0 | 0 | 0 | 0 | 0 | 0 | 0 | 0.002 | 0 | 0.002 | 0 | 0 | 0.001 | 0 |
| SV8 | 0 | 0 | 0 | 0 | 0 | 0 | 0 | 0 | 0 | 0 | 0 | 0 | 0 | 0 | 0.001 | 0 | 0.001 | 0 |
| SV9 | 0 | 0 | 0 | 0 | 0 | 0 | 0 | 0 | 0 | 0 | 0 | 0 | 0 | 0 | 0 | 0 | 0.002 | 0.041 |
| SV10 | 0 | 0 | 0 | 0 | 0 | 0 | 0 | 0 | 0 | 0 | 0 | 0 | 0 | 0.001 | 0 | 0 | 0 | 0.041 |
| SV11 | 0 | 0 | 0 | 0 | 0 | 0 | 0 | 0 | 0 | 0 | 0 | 0.065 | 0.072 | 0.014 | 0.003 | 0.002 | 0.004 | 0.003 |
| SV12 | 0 | 0 | 0 | 0 | 0 | 0 | 0 | 0 | 0 | 0 | 0 | 0 | 0.005 | 0 | 0 | 0 | 0 | 0 |
| SV13 | 0 | 0 | 0 | 0 | 0 | 0 | 0 | 0 | 0 | 0 | 0 | 0 | 0 | 0 | 0 | 0 | 0 | 0 |
| SV14 | 0 | 0 | 0 | 0 | 0 | 0 | 0 | 0 | 0 | 0 | 0 | 0 | 0 | 0 | 0 | 0 | 0.002 | 0.003 |
| SV15 | 0 | 0 | 0 | 0 | 0 | 0 | 0 | 0 | 0 | 0 | 0 | 0.015 | 0.14 | 0.002 | 0 | 0.001 | 0.004 | 0.004 |
| SV16 | 0 | 0 | 0 | 0 | 0 | 0 | 0 | 0 | 0 | 0 | 0 | 0 | 0.02 | 0 | 0 | 0 | 0 | 0 |

Fig. 13B

COLOR DETERMINATION APPARATUS, COLOR DETERMINATION METHOD, AND NON-TRANSITORY COMPUTER-READABLE MEDIUM

This application is a National Stage Entry of PCT/JP2021/020564 filed on May 28, 2021, the contents of all of which are incorporated herein by reference, in their entirety.

TECHNICAL FIELD

This disclosure relates to color determination apparatuses, color determination methods, and non-transitory computer-readable media.

BACKGROUND ART

Advancement is seen in such technology where, in response to a searcher specifying a color, an apparatus searches for and presents an image corresponding to the specified color. For example, an image searching apparatus of Patent Literature 1 extracts HSV color space data from an example image (search key) created by a searcher, and by use of this extracted HSV color space data and HSV color space data extracted from an image database, the image searching apparatus calculates the degree of similarity between the example image and each image in the image database. Then, based on the calculated degree of similarity, the image searching apparatus determines a search candidate and displays a search candidate image on a display unit.

CITATION LIST

Patent Literature

Patent Literature 1: Japanese Unexamined Patent Application Publication No. H07-073195

SUMMARY OF INVENTION

Technical Problem

This disclosure is directed to improving on the technology disclosed in the related art literature.

Solution to Problem

A color determination apparatus of one aspect according to this disclosure includes: at least one memory configured to store instructions; and at least one processor configured to execute the instructions to: extract a first color feature value from an image based on color space information defining a color space, the first color feature value being a feature value with regard to a color of the image; convert a user's specified color to a second color feature value based on the color space information and a probability distribution model expressing color ambiguity, the second color feature value being a feature value with regard to the specified color; and calculate a degree of similarity between the first color feature value and the second color feature value.

A color determination method of one aspect according to this disclosure is to be executed by a color determination apparatus, and the color determination method includes: extracting a first color feature value from an image based on color space information defining a color space, the first color feature value being a feature value with regard to a color of the image; converting a user's specified color to a second color feature value based on the color space information and a probability distribution model expressing color ambiguity, the second color feature value being a feature value with regard to the specified color; and calculating a degree of similarity between the first color feature value and the second color feature value.

A non-transitory computer-readable medium of one aspect according to this disclosure stores a program that causes a computer to execute: extracting a first color feature value from an image based on color space information defining a color space, the first color feature value being a feature value with regard to a color of the image; converting a user's specified color to a second color feature value based on the color space information and a probability distribution model expressing color ambiguity, the second color feature value being a feature value with regard to the specified color; and calculating a degree of similarity between the first color feature value and the second color feature value.

Advantageous Effects of Invention

This disclosure can provide a color determination apparatus, a color determination method, and a non-transitory computer-readable medium that each can accurately determine a color of an image with the ambiguity in human perception of colors taken into consideration.

BRIEF DESCRIPTION OF DRAWINGS

FIG. 5A shows an example of a method of dividing Hue H according to the second example embodiment;

FIG. 5B shows an example of a method of dividing Saturation S according to the second example embodiment;

FIG. 5C shows an example of a method of dividing Value V according to the second example embodiment;

FIG. 6A is a table showing an example of a two-dimensional array according to the second example embodiment;

FIG. 6B is a table showing an example of a range of Hue H according to the second example embodiment;

FIG. 6C is a table showing an example of a range of SV according to the second example embodiment;

FIG. 6D is a table showing an example of a two-dimensional array according to the second example embodiment;

FIG. 9A is a table showing an example of a two-dimensional array representing a calculation result according to the second example embodiment;

FIG. 9B is a table showing an example of a two-dimensional array representing a calculation result according to the second example embodiment;

FIG. 10A is a table showing an example of a two-dimensional array representing a calculation result according to the second example embodiment;

FIG. 10B is a table showing an example of a two-dimensional array representing a calculation result according to the second example embodiment;

FIG. 11A is a table showing an example of a two-dimensional array representing a calculation result according to the second example embodiment;

FIG. 11B is a table showing an example of a two-dimensional array representing a calculation result according to the second example embodiment;

FIG. 12A is a table showing an example of a two-dimensional array representing a calculation result according to the second example embodiment;

FIG. 12B is a table showing an example of a two-dimensional array representing a calculation result according to the second example embodiment;

FIG. 13A is a table showing an example of a two-dimensional array representing second color feature values according to the second example embodiment;

FIG. 13B is a table showing an example of a two-dimensional array representing first color feature values according to the second example embodiment;

EXAMPLE EMBODIMENT

First Example Embodiment

A first example embodiment of this disclosure will be described below with reference to some drawings. The first example embodiment discloses a color determination apparatus according to a technique of this disclosure.

[Description of Configuration]

Figure 1:
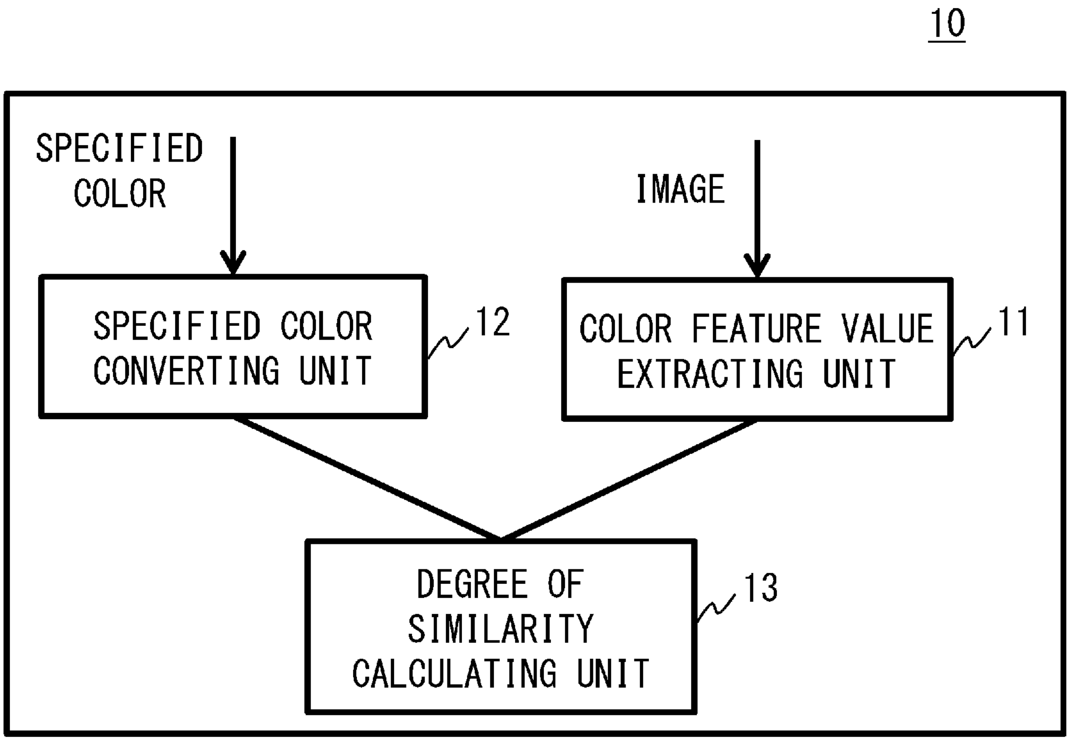
FIG. 1 is a block diagram showing one example of a color determination apparatus according to a first example embodiment.

FIG. 1 shows one example of a color determination apparatus according to the first example embodiment. A color determination apparatus 10 of FIG. 1 includes a color feature value extracting unit 11, a specified color converting unit 12, and a degree of similarity calculating unit 13. Each unit (each means) of the color determination apparatus 10 is controlled by a control unit (controller) (not shown). Each unit will be described below.

The color feature value extracting unit 11, based on color space information defining a color space, extracts a first color feature value from an image to be subjected to a determination. The first color feature value is a feature value with regard to a color of that image. The color space information defines any known color space, and examples of such a color space include, but are not limited to, an HSV color space, an HLS color space, an RGB color space, and a CMTK color space. These color spaces can each express a given color by the components constituting that color space. A first color feature value represents a coloration feature of an image and includes a feature value with regard to one or more colors in a color space.

The specified color converting unit 12 converts a user's specified color to a second color feature value based on color space information and a probability distribution model expressing color ambiguity. The second color feature value is a feature value with regard to the specified color. The color space information that the specified color converting unit 12 uses is the same as the color space information that the color feature value extracting unit 11 uses. Meanwhile, a probability distribution model gives a non-zero probability distribution not only to a specified color but also to a color similar to the specified color. "A color similar to a specified color" is a color of which, in a color space defined by color space information described above, the value of at least any one of the components in the color space is close to the value of the same component of a specified color (i.e., the difference between the values of the same component is smaller than a certain threshold). Thus, a probability distribution model can take a color other than a specified color to express color ambiguity.

A second color feature value represents a coloration feature of a specified color and includes a feature value with regard to a plurality of colors in a color space. Although a specified color is normally defined as a single color in a color space, as the specified color converting unit 12 uses a probability distribution model, as described above, a specified color is converted to a second color feature value that includes a feature value with regard to a plurality of colors.

The degree of similarity calculating unit 13 calculates the degree of similarity between a first color feature value that the color feature value extracting unit 11 has extracted and a second color feature value that the specified color converting unit 12 has converted. This degree of similarity has a higher value as a first color feature value and a second color feature value include more colors in common. Furthermore, the degree of similarity has a higher value as the values of feature values of the same color are higher in the two color feature values. As the degree of similarity has a higher value, the image to be subjected to the determination can be said to have coloration closer to the user's specified color and be more likely the image that the user desires. The degree of similarity is expressed, for example, by a predetermined numerical range, such as from 0 to 1 or from 0 to 100, but these are not limiting examples.

[Description of Process]

Figure 2:
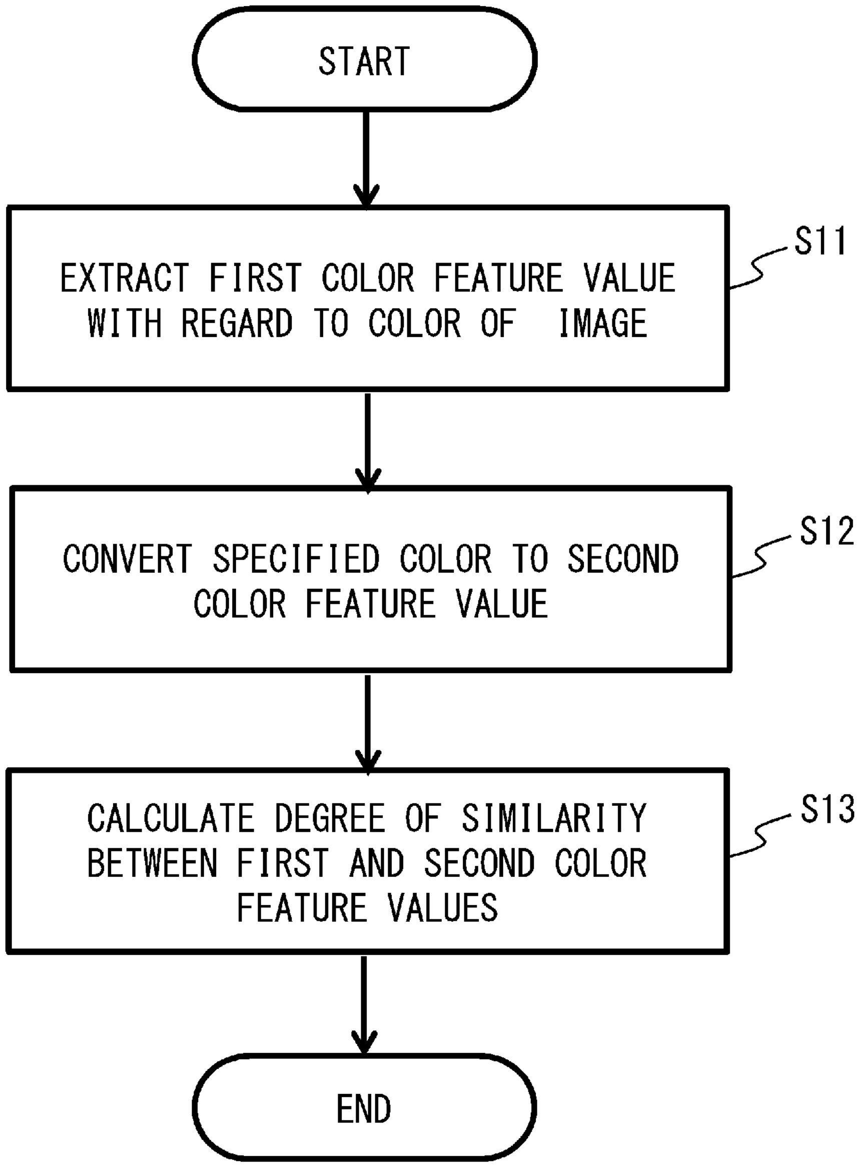
FIG. 2 is a flowchart showing an example of a process performed by the color determination apparatus according to the first example embodiment.

FIG. 2 is a flowchart showing one example of a representative process performed by the color determination apparatus 10. This flowchart illustrates the process performed by the color determination apparatus 10. First, based on color space information, the color feature value extracting unit 11 of the color determination apparatus 10 extracts, from an image to be subjected to a determination, a first color feature value, which is a feature value with regard to a color of that image (step S11; color feature value extracting step).

Meanwhile, based on the color space information and a probability distribution model expressing color ambiguity, the specified color converting unit 12 converts a user's specified color to a second color feature value, which is a feature value with regard to that specified color (step S12; color feature value converting step).

The degree of similarity calculating unit 13 calculates the degree of similarity between the first color feature value and the second color feature value (step S13; degree of similarity calculating step). This calculated degree of similarity is output and may be displayed, for example, on a display unit of the color determination apparatus 10. Alternatively, using this degree of similarity, the color determination apparatus 10 may execute a process of searching for an image. Details thereof will be described later in a second example embodiment.

Either of steps S11 and S12 may be executed first, or these steps may be executed in parallel. However, in order to shorten the time from the user's specifying of a color to the end of step S13, the process at step S11 preferably ends by the user's specifying of a color.

Description of Advantageous Effects

As described above, the color determination apparatus 10 can express the ambiguity in humans' visual perception of colors by a probability distribution model and, by applying this model to a specified color, accurately determine a color of an image with the ambiguity in human perception of colors taken into consideration.

Second Example Embodiment

A second example embodiment of this disclosure will be described below with reference to some drawings. The second example embodiment discloses a specific example of the color determination apparatus described according to the first example embodiment.

[Description of Configuration]

Figure 3:
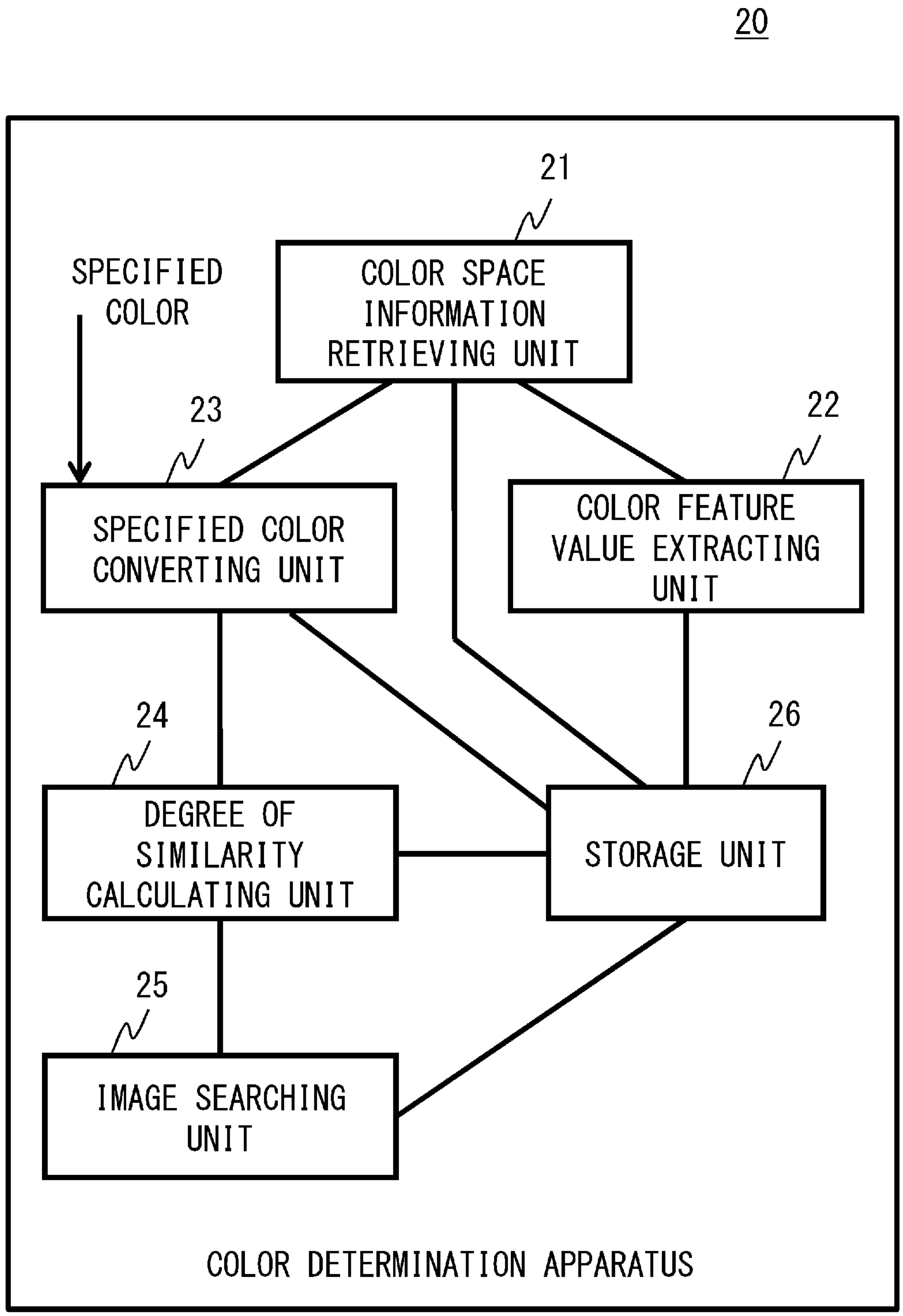
FIG. 3 is a block diagram showing one example of a color determination apparatus according to a second example embodiment.

FIG. 3 is a block diagram showing one example of a color determination apparatus 20. The color determination apparatus 20 includes a color space information retrieving unit 21, a color feature value extracting unit 22, a specified color converting unit 23, a degree of similarity calculating unit 24, an image searching unit 25, and a storage unit 26. Details of each unit will be described below.

The color space information retrieving unit 21 retrieves, from the storage unit 26, color space information defining an HSV color space and outputs the color space information to the color feature value extracting unit 22 and the specified color converting unit 23. The color space defines the granularity (detailedness) or range of each color or a method of expressing each color.

Figure 4A:
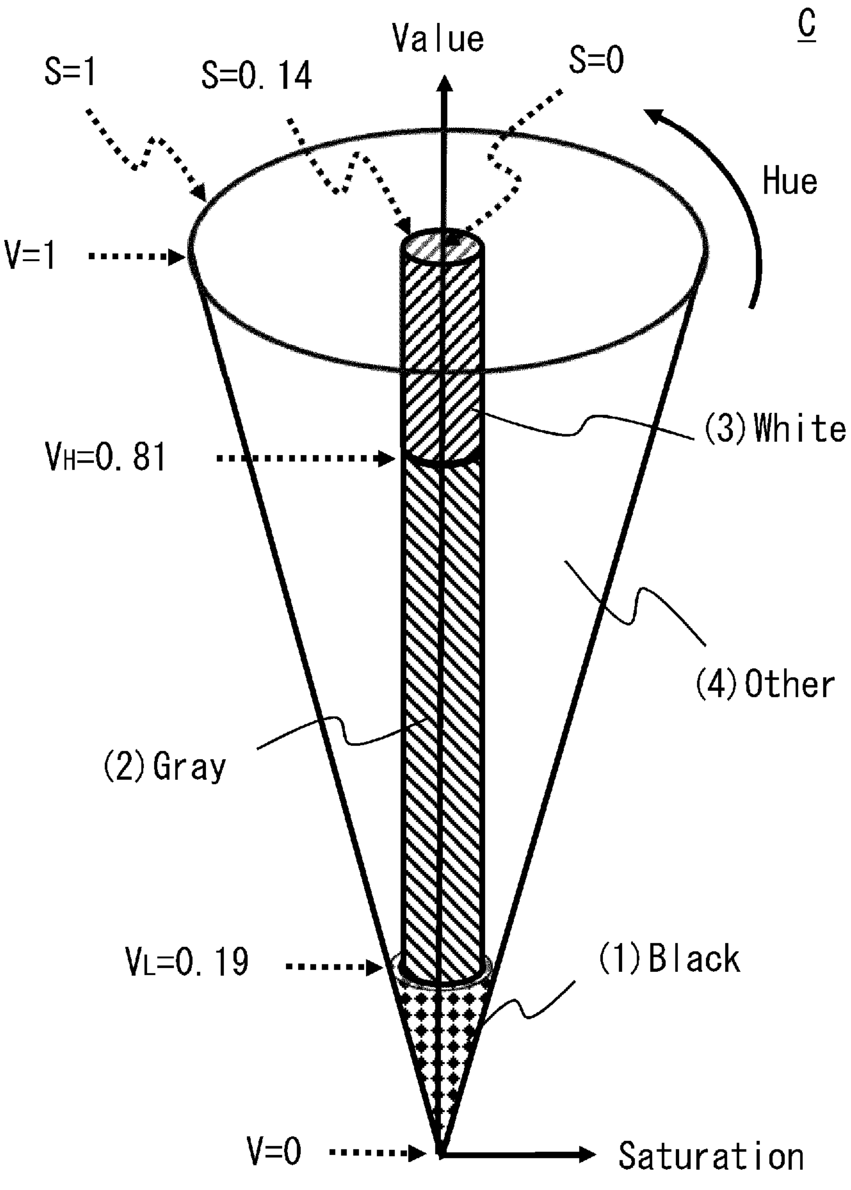
FIG. 4A shows an example of a definition of an HSV color space according to the second example embodiment.
Figure 4B:
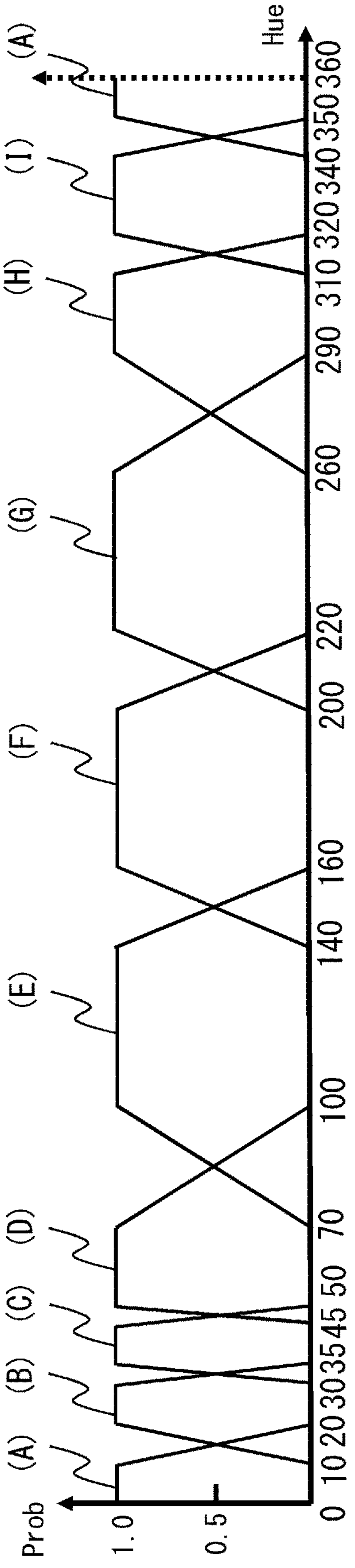
FIG. 4B shows an example of a definition of an HSV color space according to the second example embodiment.

FIGS. 4A and 4B show an example of a definition of the HSV color space according to the second example embodiment. FIG. 4A shows a representation of a conical model of the HSV color space. In a right circular cone C shown in FIG. 4A, the angle of rotation along the circumference represents Hue H, the position from the center line in the radial direction of the circle represents Saturation S, and the position in the direction of the center line represents Value V. The range of Hue H (deg) is [0, 360], the range of Saturation S is [0, 1], and the range of Value V is [0, 1]. Herein, when Saturation S (Saturation value) of a color is 0, this indicates that this color is located on the center line of the right circular cone C, and when Saturation S of a color is 1, this indicates that this color is located on the outer circumference (generatrix) of the right circular cone C. Meanwhile, when Value V (Value value) of a color is 0, this indicates that this color is located at the apex of the right circular cone C, and when Value V of a color is 1, this indicates that this color is located on the base of the right circular cone C.

According to the second example embodiment, the right circular cone C is divided into the following four areas. The four areas are Area 1 of black where Value V is lower than 0.19 (second threshold), Area 2 of gray where Value V is no lower than 0.19 nor higher than 0.81 (third threshold) and Saturation S is lower than 0.14 (fourth threshold), Area 3 of white where Value V is higher than 0.81 and Saturation S is lower than 0.14 (fifth threshold), and Area 4 of colors other than the colors of Areas 1, 2, and 3. As will be described later, the properties of a specified color vary depending on to which of Areas 1 to 4 the specified color belongs, and thus the probability distribution model to be used changes by the specified color.

FIG. 4B shows a probability distribution (Prob) of each color in Hue H of 0-360 degrees. In FIG. 4B, Red (A) takes up the range of 340-20 degrees, Brown (B) takes up the range of 10-35 degrees, Orange (C) takes up the range of 30-50 degrees, Yellow (D) takes up the range of 45-100 degrees, Green (E) takes up the range of 70-160 degrees, Cyan (F) takes up the range of 140-220 degrees, Blue (G) takes up the range of 200-290 degrees, Purple (H) takes up the range of 260-320 degrees, and Pink (I) takes up the range of 310-350 degrees. Meanwhile, areas of 10-20 degrees, 30-35 degrees, 45-50 degrees, 70-100 degrees, 140-160 degrees, 200-220 degrees, 260-290 degrees, 310-320 degrees, and 340-350 degrees are border areas between adjacent colors among (A) to (I). The probability distribution of each color takes 1 in the range taken up by that color excluding its border areas, takes a value between 1 and 0 in its border areas, and takes 0 in the remaining range. Meanwhile, the probability distribution of each color in its border areas changes by a linear function in accordance with a change in Hue H. A method of using such probability distributions will be described later. The color space information retrieving unit 21 retrieves, for use, the color space information shown in FIGS. 4A and 4B from the storage unit 26.

The description continues with reference back to FIG. 3. The color feature value extracting unit 22 extracts a feature value (first color feature value) with regard to a color of each of a plurality of images stored in the storage unit 26. This feature value expresses information pertaining to a color of an image in an HSV color space. According to the second example embodiment, the color feature value extracting unit 22 divides the HSV color space into equal parts and represents the component value of the color in each divided area in a two-dimensional array.

FIGS. 5A to 5C show methods of dividing Hue H, Saturation S, and Value V, respectively. FIG. 5A shows areas resulting from dividing Hue H into $n_h$ equal parts and indicates that Area H1 of Hue H is $(0, 360/n_h]$, Area H2 is $(360/n_h, 2*360/n_h]$, . . . , and Area $Hn_h$ is $((n_h-1)*360/n_h, 360]$. When the index of an area of Hue H is m, Area $H_m$ is $((m-1)*360/n_h, m*360/n_h]$, that is, greater than $(m-1)*360/n_h$ but no greater than $m*360/n_h$. Hue H has a periodicity of 360 degrees.

FIG. 5B shows areas resulting from dividing Saturation S into $n_s$ equal parts and indicates that Area S1 of Saturation S is $[0, 1/n_s]$, Area S2 is $(1/n_s, 2/n_s]$, . . . , and Area $Sn_s$ is $((n_s-1)/n_s, 1]$. When the index of an area of Saturation S is m, Area $S_m$ is $((m-1)/n_s, m/n_s]$, that is, greater than $(m-1)/n_s$ but no greater than $m/n_s$. When Saturation S is 0, Saturation S belongs to Area S1.

FIG. 5C shows areas resulting from dividing Value V into $n_v$ equal parts and indicates that Area V1 of Value V is $[0, 1/n_v]$, Area V2 is $(1/n_v, 2/n_v]$, . . . , and Area $Vn_v$ is $((n_v-1)/n_v, 1]$. When the index of an area of Value V is m, Area $V_m$ is ((m−1)/$n_v$, m/$n_v$], that is, greater than (m−1)/$n_v$ but no greater than m/$n_v$. When Value V is 0, Value V belongs to Area V1.

FIG. 6A shows a format of a two-dimensional array where $n_h$=18, $n_s$=4, and $n_v$=4. These values of $n_h$, $n_s$, and $n_v$ are examples of values assumed to be appropriate for expressing an RGB image in the HSV color space. In FIG. 6A, the values for all the areas are 0, which is the initialized value.

Columns H1 to H18 in FIG. 6A represent areas resulting from dividing Hue H into 18 equal parts. FIG. 6B shows specific ranges of H1 to H18, and as shown in FIG. 6B, H1 is (0, 20], H2 is (20, 40], . . . , H17 is (320, 340], and H18 is (340, 360].

Meanwhile, rows SV1 to SV16 in FIG. 6A represent areas resulting from dividing Saturation S and Value V into $n_s$*$n_v$ equal parts, that is, into 16 equal parts. FIG. 6C shows specific ranges of SV1 to SV16, and as shown in FIG. 6C, SV1 is s(0.75, 1], v(0.75, 1]; SV2 is s(0.5, 0.75], v(0.75, 1]; SV3 is s(0.25, 0.5], v(0.75, 1]; and SV4 is s[0, 0.25], v(0.75, 1]. In addition, SV5 is s(0.75, 1], v(0.5, 0.75]; SV6 is s(0.5, 0.75], v(0.5, 0.75]; SV7 is s(0.25, 0.5], v(0.5, 0.75]; and SV8 is s[0, 0.25], v(0.5, 0.75]. Furthermore, SV9 is s(0.75, 1], v(0.25, 0.5]; SV10 is s(0.5, 0.75], v(0.25, 0.5]; SV11 is s(0.25, 0.5], v(0.25, 0.5]; and SV12 is s[0, 0.25], v(0.25, 0.5]. Furthermore, SV13 is s(0.75, 1], v[0, 0.25]; SV14 is s(0.5, 0.75], v[0, 0.25]; SV15 is s(0.25, 0.5], v[0, 0.25]; and SV16 is s[0, 0.25], v[0, 0.25]. Herein, SV1 to SV4, SV5 to SV8, SV9 to SV12, and SV13 to SV16 each belong to the area of the same Value V, and SVq, SVq+4, SVq+8, and SVq+12 (q is an integer no smaller than 1 nor greater than 4) belong to the area of the same Saturation S. This method of dividing the HSV color space is stored in the storage unit 26 as color space information, and the color feature value extracting unit 22 uses this information, supplied from the color space information retrieving unit 21, to extract a feature value.

Specifically, the color feature value extracting unit 22 executes the following process.

(i) First, the color feature value extracting unit 22 acquires the RGB value of one pixel in one image. Herein, the acquired RGB value of that one pixel is assumed to be (r=0, g=0, b=1).

(ii) Next, the color feature value extracting unit 22 converts the acquired RGB value to an HSV value. When the RGB value is (r=0, g=0, b=1), the color feature value extracting unit 22 converts this RGB value to the HSV value (h=240, s=1, v=0.004).

(iii) The color feature value extracting unit 22 adds 1 to the value of the bin (the component in the two-dimensional array shown in FIG. 6A), in the two-dimensional array, that corresponds to the HSV value obtained in (ii). In the case above, the bin corresponding to the HSV value is the (SV13, H12) component in the two-dimensional array, and thus 1 is added to the bin (SV13, H12). FIG. 6D shows the two-dimensional array resulting from adding 1 to the component of that bin in FIG. 6A.

The color feature value extracting unit 22 executes the process of (i) to (iii) on each pixel in that one image. Thus, for each pixel in the one image, the color feature value extracting unit 22 stores the value of 1 for every pixel into the bin, in the two-dimensional array, that corresponds to the HSV value obtained by converting the RGB value of the corresponding pixel. Upon finishing the process on the one image, the color feature value extracting unit 22 normalizes the two-dimensional array obtained as a final result. Thus, the color feature value extracting unit 22 extracts a first color feature value with regard to the one image. The first color feature value is a feature value (the probability value) of each bin in the color space concerning the color of the image. The color feature value extracting unit 22 executes these processes on each of a plurality of images stored in the storage unit 26 and extracts, in advance, a first color feature value of each image.

The description continues with reference back to FIG. 3. The specified color converting unit 23 acquires a color specified by a user (specified color) to search for an image and, by employing a probability distribution model, converts the specified color to a second color feature value, which is a feature value with regard to the specified color. This second color feature value is a feature value representing the probability distribution of the color in the HSV color space. For a specified color, a single color is specified as a user provides an input via an input unit (not shown) of the color determination apparatus 20. A plurality of color candidates may be displayed on a display unit (not shown) of the color determination apparatus 20, and a user may select one from the plurality of colors to specify a specified color.

A probability distribution model is a model expressing the ambiguity of a specified color and the probability peaks (takes a peak value) at the specified color. A probability distribution model is a tent-shaped window function that gives a value greater than 0 to a color (target color) that is within a predetermined distance from a specified color in the HSV color space and gives a higher probability as the distance between the specified color and the target color in the HSV color space is smaller. Herein, the distance is the interval between the area of the specified color and the area of the target color, as shown in FIGS. 5A to 5C, in any one of Hue H, Saturation S, or Value V.

For example, with regard to Hue H shown in FIG. 5A, when a specified color is in Area $h_1$ and a target color is in Area $h_2$ ($h_1$ and $h_2$ are each an integer no smaller than 1 nor greater than $n_h$), the distance between the two in Hue H is the smaller of $|h_1-h_2|$ or $n_h-|h_1-h_2|$. A reason for such a distance is that Hue H has a periodicity of 360 degrees, as mentioned above. Meanwhile, with regard to Saturation S shown in FIG. 5B, when a specified color is in Area $s_1$ and a target color is in Area $s_2$, the distance between the two in Saturation S is $|s_1-s_2|$. With regard to Value V shown in FIG. 5C, when a specified color is in Area $v_1$ and a target color is in Area $v_2$, the distance between the two in Value V is $|v_1-v_2|$.

Figures 7, 8:
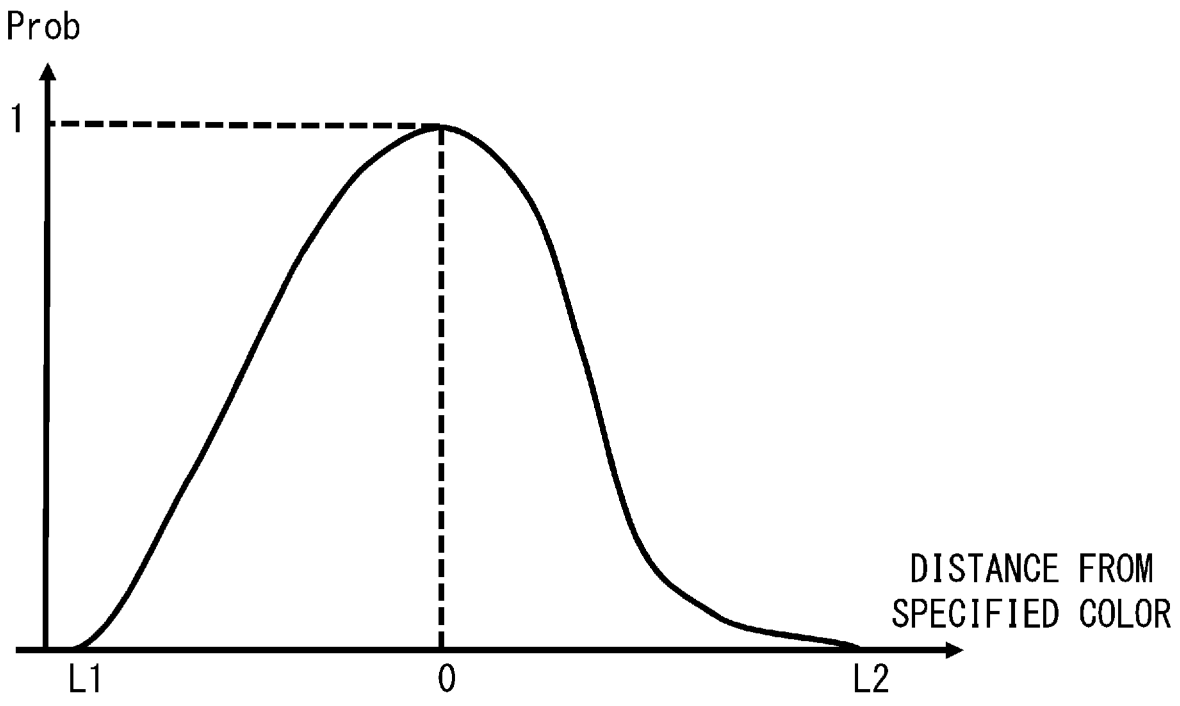
FIG. 7 is a graph showing one example of a probability distribution model according to the second example embodiment.
FIG. 8 is a table showing ranges of Hue H, Saturation S, and Value V in each area according to the second example embodiment as well as the case of the probability distribution model to be applied in each area.

FIG. 7 is a graph showing one example of such a probability distribution model. In FIG. 7, the probability at the specified color is 1, which is the maximum value, and the probability takes a value that is not 0 at a target color within a range where the distance from the specified color is from L1 to L2 (L1 is a negative integer, and L2 is a positive integer). The distance from 0 to L1 and the distance from 0 to L2 may be the same as or different from each other. When the distance from 0 to L1 and the distance from 0 to L2 are the same, the shape of the graph may or may not be symmetric about the specified color. In the example described below, an example is described in which the shape of the graph is symmetric about the specified color.

In this example, the specified color converting unit 23 uses the Gaussian, indicated below, as a probability distribution model that gives the probability of a target color.

[Math. 1]

$$p = e^{-\frac{d_h^2}{2\sigma_h^2}-\frac{d_s^2}{2\sigma_s^2}-\frac{d_v^2}{2\sigma_v^2}} \tag{1}$$

In (1), $d_h$, $d_s$, and $d_v$ represent, with regard to Hue H, Saturation S, and Value V, respectively, the distance from the bin which the target color belongs to in the two-dimensional array (target bin) to the bin which the specified color belongs to in the two-dimensional array (actual bin). Although the concept of the distance is as described earlier, if description is to be added, $d_h$, $d_s$, and $d_v$ can also be expressed by the following equations.

[Math. 2]

$$\begin{aligned} d_h &= |Col_t - Col_a|, \\ d_s &= |RowS_t - RowS_a|, \\ d_v &= |RowV_t - RowV_a| \end{aligned} \tag{2}$$

In the above, $Col_t$ is the index, in the area of Hue H shown in FIG. 5A, at the target bin in the two-dimensional array shown in FIG. 6A, and $RowS_t$ and $RowV_t$ are the indices, in the areas of Saturation S and Value V shown in FIGS. 5B and 5C, respectively, at the aforementioned target bin. Meanwhile, Cola is the index, in the area of Hue H shown in FIG. 5A, at the actual bin in the two-dimensional array shown in FIG. 6A, and $RowS_a$ and $RowV_a$ are the indices, in the areas of Saturation S and Value V shown in FIGS. 5B and 5C, respectively, at the aforementioned actual bin.

Meanwhile, $\sigma_h$, $\sigma_s$, and $\sigma_v$ in (1) represent the standard deviations of the Gaussian with respect to Hue H, Saturation S, and Value V, respectively. These standard deviations allow for giving the probability of the target color corresponding to the degree of change in the target color from the specified color with respect to Hue H, Saturation S, and Value V. As described above, the probability distribution model gives a non-zero probability even to a target color having coloration close to the coloration of the specified color.

FIG. 8 is a table showing the ranges of Hue H, Saturation S, and Value V in Areas 1 to 4 shown in FIG. 4A as well as the cases of the probability distribution models to be employed in the respective areas. As shown in FIG. 4A, Area 1 of black is Case A, Area 3 of white is Case B, Area 2 of gray is Case C, and Area 4 of other colors is Case D. Herein, in each of the cases, $\sigma_h$, $\sigma_s$, and $\sigma_v$ in (1) change, as will be described later. Based on which of Areas 1 to 4 a specified color belongs to, the specified color converting unit 23 selects an appropriate probability distribution model in accordance with this table and calculates the probability shown in (1). The probability distribution model of each case will be described below.

(Case A)

When the specified color belongs to Area 1, $\sigma_h$, $\sigma_s$, and $\sigma_v$ take the following values.

[Math. 3]

$$\sigma_h = \lceil n_h/2 \rceil,\ \sigma_s = n_s,\ \sigma_v = n_v \tag{3}$$

Meanwhile, when s at the actual bin of the specified color is lower than 0.14, the specified color converting unit 23 sets the distance $d_h$ in (1) to 0. As described above, s at the border between Area 2 of gray or Area 3 of white and Area 4 of other colors takes s=0.14, and s=0.14 has a meaning of being a border dividing gray scale colors and other others in the HSV color space. Therefore, in Area 1, when s at the actual bin is lower than 0.14, the target color and the specified color can be regarded as the same gray scale color, and thus the distance between the two in Hue H can be considered 0.

Meanwhile, the range of Value V in Area 1 is v[0, 0.19), and thus in the two-dimensional array shown in FIG. 6A, rows where the probability of other than 0 can be given are the total of four rows SV13 to SV16 that include the stated range. By use of this setting, two examples of Case A will be described below.

Example A1

When HSV of a specified color is h=0, s=0, and v=0 and the specified color is pure black, the actual bin belongs to the entirety of the row SV16. In this case, if the specified color converting unit 23 is to calculate the probability of, for example, a target bin at (SV14, H2) in a two-dimensional array, since the specified color has s=0, as mentioned above, this yields $d_h$=0. Meanwhile, since $d_s$=2 and $d_v$=0 hold based on the definition of the distance, the specified color converting unit 23 calculates the probability of this target bin as follows.

[Math. 4]

$$p = e^{-\frac{d_s^2}{2\sigma_s^2}} = e^{-\frac{2^2}{2*4^2}} \approx 0.88 \tag{4}$$

The specified color converting unit 23 executes a similar calculation with regard to the other bins in SV13 to SV16. FIG. 9A is a table (two-dimensional array) showing the calculation results. B1 in FIG. 9A denotes the actual bin of the specified color, and B2 denotes the target bin, described above, at (SV14, H2).

Example A2

In another example, when HSV of a specified color is h=10, s=0.8, and v=0.15, the actual bin belongs to (SV13, H1). In this case, if the specified color converting unit 23 is to calculate the probability of, for example, a target bin at (SV16, H5) in a two-dimensional array, since the specified color has s=0.8, this does not yield $d_h$=0. Since $d_h$=4, $d_s$=3, and $d_v$=0 hold based on the definition of the distance, the specified color converting unit 23 calculates the probability of this target bin as follows.

[Math. 5]

$$p = e^{-\frac{d_h^2}{2\sigma_h^2}-\frac{d_s^2}{2\sigma_s^2}} = e^{-\frac{4^2}{2*9^2}-\frac{3^2}{2*4^2}} \approx 0.68 \tag{5}$$

The specified color converting unit 23 executes a similar calculation with regard to the other bins in SV13 to SV16. FIG. 9B is a table (two-dimensional array) showing the calculation results. B3 in FIG. 9B denotes the actual bin of the specified color, and B4 denotes the target bin, described above, at (SV16, H5).

Although the bins in the row SV16 all have different probability values in FIG. 9B, the calculation example is not limited to this example, and there may be bins having the same probability value in the row SV16. For example, the probability value may be the same in the entirety of the row SV16.

(Case B)

When a specified color belongs to Area 3, $\sigma_h$, $\sigma_s$, and $\sigma_v$ take the values shown in (3). Meanwhile, when s at the actual bin of the specified color is 0, the specified color converting unit 23 sets the distance $d_h$ in (1) to 0. A reason for this is that, since no color is in the specified color when s at the actual bin is 0, the distance between the actual bin and the target bin is determined by $d_s$ and $d_v$, regardless of Hue H of the target color.

Meanwhile, since the ranges of Saturation S and Value V in Area 1 are, respectively, s[0, 0.14) and v(0.81, 1], in the two-dimensional array shown in FIG. 6A, the probability of other than 0 can be given in a single row of SV4 that includes the stated ranges. By use of this setting, two examples of Case B will be described below.

Example B1

When HSV of a specified color is h=0, s=0, and v=1 and the specified color is pure white, the actual bin belongs to the entirety of the row SV4. In this case, if the specified color converting unit 23 is to calculate the probability of, for example, the target bins in the entire row of SV14 in a two-dimensional array, since the specified color has s=0, as mentioned above, this yields $d_h$=0. Meanwhile, since $d_s$=0 and $d_v$=0 hold based on the definition of the distance, the specified color converting unit 23 calculates the probability of this target bin as follows.

[Math. 6]

$$p = e^0 = 1 \tag{6}$$

The specified color converting unit 23 executes a similar calculation with regard to the other bins in SV4. FIG. 10A is a table (two-dimensional array) showing the calculation results. B5 in FIG. 10A denotes the actual bin of the specified color, and B6 denotes the target bin described above.

Example B2

In another example, when HSV of a specified color is h=10, s=0.1, and v=0.9, the actual bin belongs to (SV4, H1). In this case, if the specified color converting unit 23 is to calculate the probability of, for example, a target bin at (SV4, H7) in a two-dimensional array, since the specified color has s=0.1, this does not yield $d_h$=0. Since $d_h$=6, $d_s$=0, and $d_v$=0 hold based on the definition of the distance, the specified color converting unit 23 calculates the probability of this target bin as follows.

[Math. 7]

$$p = e^{-\frac{d_h^2}{2\sigma_h^2}} = e^{-\frac{6^2}{2*9^2}} \approx 0.80 \tag{7}$$

The specified color converting unit 23 executes a similar calculation with regard to the other bins in SV4. FIG. 10B is a table (two-dimensional array) showing the calculation results. B7 in FIG. 10B denotes the actual bin of the specified color, and B8 denotes the target bin, described above, at (SV4, H7).

(Case C)

When a specified color belongs to Area 2, $\sigma_h$, $\sigma_s$, and $\sigma_v$ take the following values.

[Math. 8]

$$\sigma_h = \lceil n_h/2 \rceil,\ \sigma_s = n_s,\ \sigma_v = \left\lfloor \frac{|\mathrm{Row}V_{0.19} - \mathrm{Row}V_{0.81}|}{2} \right\rfloor = 1 \tag{8}$$

Meanwhile, when s at the actual bin of the specified color is 0, the specified color converting unit 23 sets the distance $d_h$ in (1) to 0. A reason for this is the same as the reason provided in Case B, and thus description thereof will be omitted.

Meanwhile, since the ranges of Saturation S and Value V in Area 2 are s[0, 0.14) and v(0.19, 0.81], respectively, in the two-dimensional array shown in FIG. 6A, the probability of other than 0 can be given in the total of four rows SV4, SV8, SV12, and SV16 that include the stated ranges. By use of this setting, two examples of Case C will be described below.

Example C1

When HSV of a specified color is h=0, s=0, and v=0.7 and the specified color is pure gray, the actual bin belongs to the entirety of the row SV8. In this case, if the specified color converting unit 23 is to calculate the probability of, for example, the target bins in the entire row of SV4 in a two-dimensional array, since the specified color has s=0, as mentioned above, this yields $d_h$=0. Meanwhile, since $d_s$=0 and $d_v$=1 hold based on the definition of the distance, the specified color converting unit 23 calculates the probability of this target bin as follows.

[Math. 9]

$$p = e^{-\frac{d_v^2}{2\sigma_v^2}} = e^{-\frac{1^2}{2*1^2}} \approx 0.61 \tag{9}$$

The specified color converting unit 23 executes a similar calculation with regard to the other bins in SV4, SV8, SV12, and SV16. FIG. 11A is a table (two-dimensional array) showing the calculation results. B9 in FIG. 11A denotes the actual bin of the specified color, and B10 denotes the target bin described above.

Example C2

In another example, when HSV of a specified color is h=10, s=0.1, and v=0.3, the actual bin belongs to (SV12, H1). In this case, if the specified color converting unit 23 is to calculate the probability of, for example, the target bin at (SV8, H5) in a two-dimensional array, since the specified color has s=0.1, this does not yield $d_h$=0. Since $d_h$=4, $d_s$=0, and $d_v$=1 hold based on the definition of the distance, the specified color converting unit 23 calculates the probability of this target bin as follows.

[Math. 10]

$$p = e^{-\frac{d_h^2}{2\sigma_h^2}-\frac{d_v^2}{2\sigma_v^2}} = e^{-\frac{4^2}{2*9^2}-\frac{1^2}{2*1^2}} \approx 0.56 \tag{10}$$

The specified color converting unit 23 executes a similar calculation with regard to the other bins in SV4, SV8, SV12, and SV16. FIG. 11B is a table (two-dimensional array) showing the calculation results. B11 in FIG. 11B denotes the actual bin of the specified color, and B12 denotes the target bin, described above, at (SV8, H5).

(Case D)

When a specified color belongs to Area 4, the specified color converting unit 23 determines which color area of (A) to (I) in FIG. 4B the specified color belongs to. When the specified color belongs to a range other than the border areas between colors (i.e., when the probability is 1), the target color falls in the border areas (i.e., areas where the probability takes a value between 1 and 0) between the color area of that range and the color adjacent to and on the left of that color area and between the color area of that range and the color adjacent to and on the right of that color area. When a specified color belongs to a border area between a color A and an adjacent color B (i.e., an area where the probability takes a value between 1 and 0), the target color falls in, of that border area and the color area of the color A adjacent to and on the left of the border area and the color area of the color B adjacent to and on the right of the border area, the range excluding the border area between these colors (i.e., an area where the probability is 1). Additionally, the specified color converting unit 23 sets the following values to $\sigma_h$, $\sigma_s$, and $\sigma_v$.

[Math. 11]

$$\sigma_h = |Col_{left}| + |Col_{true}| + |Col_{right}|, \tag{11}$$

$$\sigma_s = \left\lceil \frac{\text{Row}S_{0.14}}{2} \right\rceil = 2,$$

$$\sigma_v = \left\lceil \frac{\text{Row}V_{0.19}}{2} \right\rceil = 2$$

$Col_{true}$ in (11) represents a column of a color area which an actual bin belongs to in the two-dimensional array of FIG. 6A, and $|Col_{true}|$ represents the number of columns of the color area which the actual bin belongs to. $Col_{left}$ and $Col_{right}$ each represent a column of a color area located to the left or the right of other than that color area in the two-dimensional array of FIG. 6A, in the color area which the actual bin belongs to (in (A) to (I) in FIG. 4B, either a border area or a range, other than the border areas, where the probability is 1). $|Col_{left}|$ and $|Col_{right}|$ represent the respective numbers of such columns. Herein, the probability has a value that is not 0 in each bin in $Col_{true}$, $Col_{left}$, and $Col_{right}$.

The specified color converting unit 23 adds 1 to the value of each of $d_h$, $d_s$, and $d_v$ when the following conditions are met.

[Math. 12]

$$\text{if } Col_t \notin Col_{true},\ d_h \rightarrow d_h + 1 \tag{12}$$

[Math. 13]

$$\text{if Row}S_t = \text{Row}S_{0.14} \neq \text{Row}S_a,\ d_s \rightarrow d_s + 1 \tag{13}$$

-continued

[Math. 14]

$$\text{if Row}V_t = \text{Row}V_{0.19} \neq \text{Row}V_a,\ d_v \rightarrow d_v + 1 \tag{14}$$

In other words, when the column of the color area which the target bin belongs to in the two-dimensional array differs from the column of the color area which the actual bin belongs to in the two-dimensional array, the specified color converting unit 23 adds 1 to $d_h$ to lower the probability of the target bin. To rephrase, in FIG. 4B, when the color area which h of the target bin belongs to (a border area or a range where the probability is 1, excluding border areas) differs from the color area which h of the actual bin belongs to, the specified color converting unit 23 adds 1 to $d_h$ to lower the probability of the target bin. A reason for this is that, when Hue H of a target color and Hue H of a specified color are in different areas, the coloration of the two colors look more different to human, as compared to a case in which the colors have different Saturations S or different Values V.

Meanwhile, in FIG. 5B, when the area S which s of the target bin belongs to is the same as the area S which s=0.14 at the border of Area 4 belongs to but is different from the area S which s of the actual bin belongs to, the specified color converting unit 23 adds 1 to $d_s$ to lower the probability of the target bin. In a similar manner, in FIG. 5C, when the area V which v of the target bin belongs to is the same as the area V which v=0.19 at the border of Area 4 belongs to but is different from the area V which v of the actual bin belongs to, the specified color converting unit 23 adds 1 to $d_v$ to lower the probability of the target bin. A reason for this is the following. When at least either of Saturation S and Value V of a target color differs from Saturation S or Value V of a specified color by a predetermined value, a comparison is made between a case in which the target color is close to any of black, white, or gray and a case in which the target color is far from any of these colors. In this case, the coloration of the specified color and the coloration of the target color look more different to humans in the former case than in the latter case.

In the manner described above, the specified color converting unit 23 gives a "penalty" to the probability of a target color under a predetermined condition and can thus set a probability distribution model that is based further on how humans perceive colors. Examples that use this setting will be described below.

Example D1

When HSV of a specified color is h=110, s=0.2, and v=0.7, the actual bin belongs to (SV8, H6). Meanwhile, since h=110 holds in the specified color, the range of the color which the specified color belongs to is the range of 100-140 degrees of Green (E) shown in FIG. 4B, excluding its border areas. Therefore, the targets for which the specified color converting unit 23 calculates the probability are the area of 100-140 degrees and the border areas of 70-100 degrees and of 140-160 degrees on the left and the right of the stated area in FIG. 4B. These areas cover the area in the total of five columns H4 to H8 in FIG. 6B. In the two-dimensional array of FIG. 6A, $Col_{true}$ is the columns H6 to H7 which the area of 100-140 degrees belongs to, and $Col_{left}$ and $Col_{right}$ are, respectively, the columns H4 to H5 which the area of 70-100 degrees belongs to and the column H8 which the area of 140-160 degrees belongs to. At this point, if the specified color converting unit 23 is to calculate the probability of the target bin at (SV13, H4) in the two-dimensional array, since the columns (i.e., H4 to H5) of the area (i.e., 70-100 degrees) which h of the target bin belongs to in FIG. 4B differ from the columns (i.e., H6 to H7) of the area (i.e., 100-140 degrees) which the actual bin belongs to in FIG. 4B, a penalty of "1" is added to $d_h$, whose original distance is "2," and this addition yields $d_h$ of "3." Furthermore, $d_s$=3 holds based on the definition of the distance. Then, since the area V which v of the target bin belongs to is the same as the area V which v=0.19 at the border of Area 4 belongs to but is different from the area V which v of the actual bin belongs to, a penalty of "1" is added to $d_v$, whose original distance is "2," and this addition yields $d_v$ of "3." Meanwhile, $\sigma_h$ has 2+2+1=5. Based on the above, the specified color converting unit 23 calculates the probability of this target bin as follows.

[Math. 15]

$$p = e^{-\frac{d_h^2}{2\sigma_h^2}-\frac{d_s^2}{2\sigma_s^2}-\frac{d_v^2}{2\sigma_v^2}} = e^{-\frac{3^2}{2*(2+2+1)^2}-\frac{3^2}{2*2^2}-\frac{3^2}{2*2^2}} \approx 0.09 \quad (15)$$

The specified color converting unit 23 executes a similar calculation with regard to the other bins in H4 to H8. FIG. 12A is a table (two-dimensional array) showing the calculation results. B13 in FIG. 12A denotes the actual bin of the specified color, and B14 denotes the target bin described above.

Example D2

In another example, when HSV of a specified color is h=90, s=0.2, and v=0.7, the actual bin belongs to (SV8, H5). Meanwhile, since h=90 holds in the specified color, the range of the color which the specified color belongs to is the range of 70-100 degrees, which is the border area between Yellow (D) and Green (E) in FIG. 4B. Therefore, the targets for which the specified color converting unit 23 calculates the probability are the range of 70-100 degrees, the range of 50-70 degrees of the area of Yellow (D) excluding its border area, and the range of 100-140 degrees of the area of Green (E) excluding its border areas in FIG. 4B. These areas cover the area in the total of five columns H3 to H7 in FIG. 6B. In the two-dimensional array of FIG. 6A, $Col_{true}$ is the columns H4 to H5 which the area of 70-100 degrees belongs to, and $Col_{left}$ and $Col_{right}$ are, excluding the columns of $Col_{true}$, the column H3 which the area of 50-70 degrees belongs to and the columns H6 to H7 which the area of 100-140 degrees belongs to, respectively.

At this point, if the specified color converting unit 23 is to calculate the probability of the target bin at (SV13, H3) in the two-dimensional array, since the column (i.e., H3) of the area (i.e., 50-70 degrees) which h of the target bin belongs to in FIG. 4B differs from the columns (i.e., H4 to H5) of the area (i.e., 70-100 degrees) which the actual bin belongs to in FIG. 4B, a penalty of "1" is added to $d_h$, whose original distance is "2," and this addition yields $d_h$ of "3." Furthermore, $d_s$=3 holds based on the definition of the distance. Then, for a reason similar to the reason described in (Example D1), a penalty of "1" is added to $d_v$, whose original distance is "2," and this addition yields $d_v$ of "3." Meanwhile, $\sigma_h$ has 2+1+2=5. Based on the above, the specified color converting unit 23 calculates the probability of this target bin as follows.

[Math. 16]

$$p = e^{-\frac{d_h^2}{2\sigma_h^2}-\frac{d_s^2}{2\sigma_s^2}-\frac{d_v^2}{2\sigma_v^2}} = e^{-\frac{3^2}{2*(2+1+2)^2}-\frac{3^2}{2*2^2}-\frac{3^2}{2*2^2}} \approx 0.09 \quad (16)$$

Meanwhile, if the specified color converting unit 23 is to calculate the probability of another target bin at (SV4, H6) in the two-dimensional array, since the columns (i.e., H6 to H7) of the area (i.e., 100-140 degrees) which h of the target bin belongs to in FIG. 4B differ from the columns (i.e., H4 to H5) of the area (i.e., 70-100 degrees) which the actual bin belongs to in FIG. 4B, a penalty of "1" is added to $d_h$, whose original distance is "1," and this addition yields $d_h$ of "2." Furthermore, $d_s$=0 and $d_v$=1 hold based on the definition of the distance. Meanwhile, $\sigma_h$ has 2+1+2=5. Based on the above, the specified color converting unit 23 calculates the probability of this target bin as follows.

[Math. 17]

$$p = e^{-\frac{d_h^2}{2\sigma_h^2}-\frac{d_v^2}{2\sigma_v^2}} = e^{-\frac{2^2}{2*(2+1+2)^2}-\frac{1^2}{2*2^2}} \approx 0.81 \quad (17)$$

The specified color converting unit 23 executes a similar calculation with regard to the other bins in H3 to H7. FIG. 12B is a table (two-dimensional array) showing the calculation results. B15 in FIG. 12B denotes the actual bin of the specified color, and B16 and B17 denote the target bins indicated by (16) and (17), respectively.

In the manner described above, the specified color converting unit 23 changes the probability distribution model being used, based on the area which the specified color belongs to in the HSV color space. Then, as a two-dimensional array such as those shown in FIGS. 9A to 12B, the specified color converting unit 23 derives a second color feature value (feature value with regard to each bin in a color space) with regard to the specified color as well as a color similar to that specified color. When performing the calculation, the specified color converting unit 23 acquires, from the storage unit 26, rules and data used in the calculations shown in (1) to (3), (8), (11) to (14), FIGS. 4A to 6D, or FIG. 8 or the like.

The description continues with reference back to FIG. 3. The degree of similarity calculating unit 24 calculates, for each image, the degree of similarity between a first color feature value of the image that the color feature value extracting unit 22 has extracted and a second color feature value of a specified color that the specified color converting unit 23 has derived. When performing the calculation, the degree of similarity calculating unit 24 acquires the first color feature value from the storage unit 26. The degree of similarity calculating unit 24 calculates the degree of similarity sim as follows by use of data of the target color concerning the second color feature value.

[Math. 18]

$$\text{if } \mathrm{Sum}_o > 0 \text{ and } \mathrm{Sum}T_o < \theta, \tag{18}$$

$$sim(o, q) = \frac{\mathrm{Dot}(Hist_o, Hist_q)}{\mathrm{Sum}_o} * D1$$

$$D1 = \left(1 + \left(\frac{\mathrm{Sum}T_o}{\theta} - 1\right) \cdot e^{\frac{SumT_o}{\theta}}\right)$$

[Math. 19]

$$\text{if } \mathrm{Sum}_o > 0 \text{ and } \mathrm{Sum}T_o \geq \theta, \tag{19}$$

$$sim(o, q) = \frac{\mathrm{Dot}(Hist_o, Hist_q)}{\mathrm{Sum}_o} * D2$$

$$D2 = \left(1 + \frac{1}{2} \cdot \frac{\mathrm{Sum}T_o - \theta}{1 - \theta} \cdot e^{-\frac{SumT_o - \theta}{1-\theta}}\right)$$

In the above, $\mathrm{Sum}_o$ is the sum total of the values at the bins of a first color feature value o in the two-dimensional array corresponding to the actual bin and the target bin of a second color feature value q (i.e., bins where the value of the probability in the two-dimensional array is not 0). Meanwhile, $\mathrm{SumT}_o$ is the sum total of the values at the bins of the first color feature value o in the two-dimensional array corresponding to the primary bins of the second color feature value q. Herein, a primary bin is a bin whose value in the two-dimensional array is higher than a threshold η. The threshold η can take any value from 0 to 1 and is expressed, for example, by the following equation.

[Math. 20]

$$\eta = e^{-0.5} \tag{20}$$

Herein, θ is a threshold for separating into different cases of proportions of a primary target color in the first color feature value o (image) and can be set by a user via an input unit (setting means) of the color determination apparatus 20. Meanwhile, sim(o,q) is the degree of similarity to be calculated between the first color feature value o and the second color feature value q. $\mathrm{Dot}(\mathrm{Hist}_o, \mathrm{Hist}_q)$ is the dot product of the two-dimensional array of the color feature value q and the two-dimensional array of the color feature value o.

When $\mathrm{Sum}_o$ is 0, that is, when the sum total of the values at the bins of the color feature value o in the two-dimensional array corresponding to the actual bin and the target bin of the color feature value q is 0, the image concerning the color feature value o can be said to have no relevance to the specified color. Therefore, the degree of similarity calculating unit 24 derives 0 as sim(o,q).

When $\mathrm{Sum}_o$ is not 0 and $\mathrm{SumT}_o$ is smaller than 0, the degree of similarity calculating unit 24 multiplies sim(o,q) by a parameter D1 indicated in (18). This parameter D1 has a value in the range of from 0 to 1 and has a function of reducing the value of sim(o,q). When $\mathrm{SumT}_o$ is smaller than 0, the proportions of the specified color and the target color are low in the image for which the degree of similarity is to be calculated. Therefore, the degree of similarity calculating unit 24 calculates a lower degree of similarity for that image. This can suppress a situation in which a high degree of similarity is calculated depending on the color serving as noise included in the image for which the degree of similarity is to be calculated.

Meanwhile, when $\mathrm{Sum}_o$ is not 0 and $\mathrm{SumT}_o$ is no smaller than 0, the degree of similarity calculating unit 24 multiplies sim(o,q) by a parameter D2 indicated in (19). This parameter D2 has a value greater than 1 and has a function of raising the value of sim(o,q). When $\mathrm{SumT}_o$ is no smaller than 0, the proportions of the specified color and the target color are high in the image for which the degree of similarity is to be calculated. Therefore, the degree of similarity calculating unit 24 calculates a higher degree of similarity for that image.

FIG. 13A shows a result obtained when, when the RGB value of a specified color is (r=146, g=53, b=53), the specified color converting unit 23 has converted the RGB value of the specified color to the HSV value based on the color space information acquired from the color space information retrieving unit 21 and has derived the second color feature value based on the converted HSV value. Meanwhile, FIG. 13B shows an example of a first color feature value that the color feature value extracting unit 22 has extracted from an image. By use of the color feature values shown in FIGS. 13A and 13B, the degree of similarity calculating unit 24 calculates the degree of similarity as described above and can, as a result, calculate the value of sim(o,q) to be "0.84028."

For images within the range that a user has specified via the input unit among the images stored in the storage unit 26, the degree of similarity calculating unit 24 calculates the degree of similarity between the first color feature value of each of the images and the second color feature value with regard to the specified color. The degree of similarity calculating unit 24 then outputs the calculated degree of similarity of each image to the image searching unit 25. When performing the calculation, the degree of similarity calculating unit 24 acquires, from the storage unit 26, rules and parameters used in the calculations shown in (18) to (20) or the like.

The description continues with reference back to FIG. 3. The image searching unit 25 generates an image search result based on the degree of similarity of each image that the degree of similarity calculating unit 24 has output. Any known methods can be applied to this generation method as appropriate. For example, for each image, the image searching unit 25 may generate an image search result such that images are displayed on a display unit of the color determination apparatus 20 in order of a higher degree of similarity. Alternatively, the image searching unit 25 may generate an image search result such that, when images with a degree of similarity no lower than a threshold are displayed or when images are arrayed in order of a higher degree of similarity, images ranked within a certain threshold are displayed on a display unit of the color determination apparatus 20. In this process of generating a search result, the image searching unit 25 acquires, from the storage unit 26, the method of generating the search result. Meanwhile, by operating an input unit to input an instruction, the user can check a selected image or provide an input to the effect that a selected image is the user's desired image.

The storage unit 26 stores images to be used in each unit of the color determination apparatus 20 described above, color space information, rules, parameters, and data to be used in calculations, and a method of generating a search result. Each unit acquires these pieces of data by accessing the storage unit 26.

Description of Process

Figure 14A:
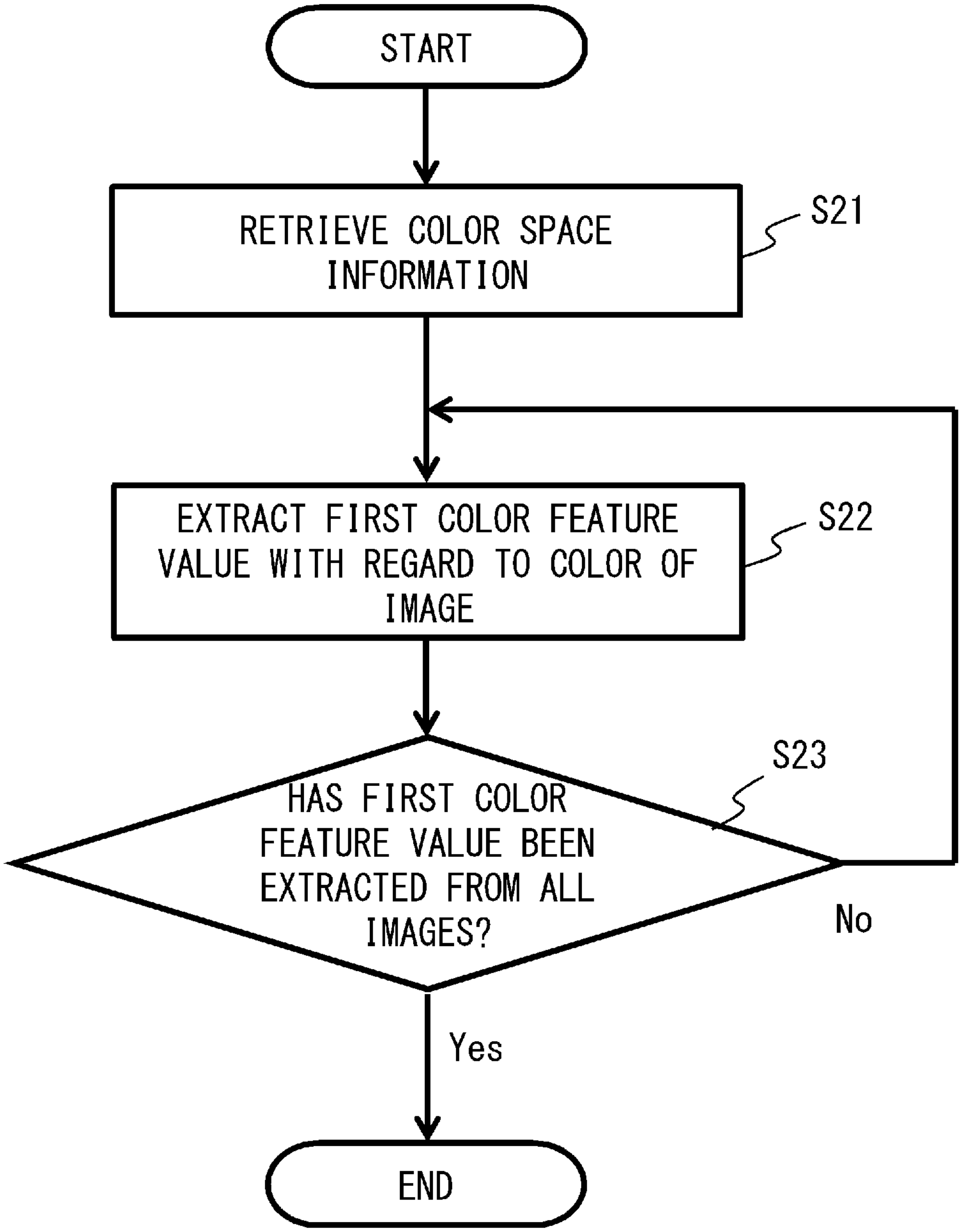
FIG. 14A is a flowchart showing an example of a process performed by the color determination apparatus according to the second example embodiment.
Figure 14B:
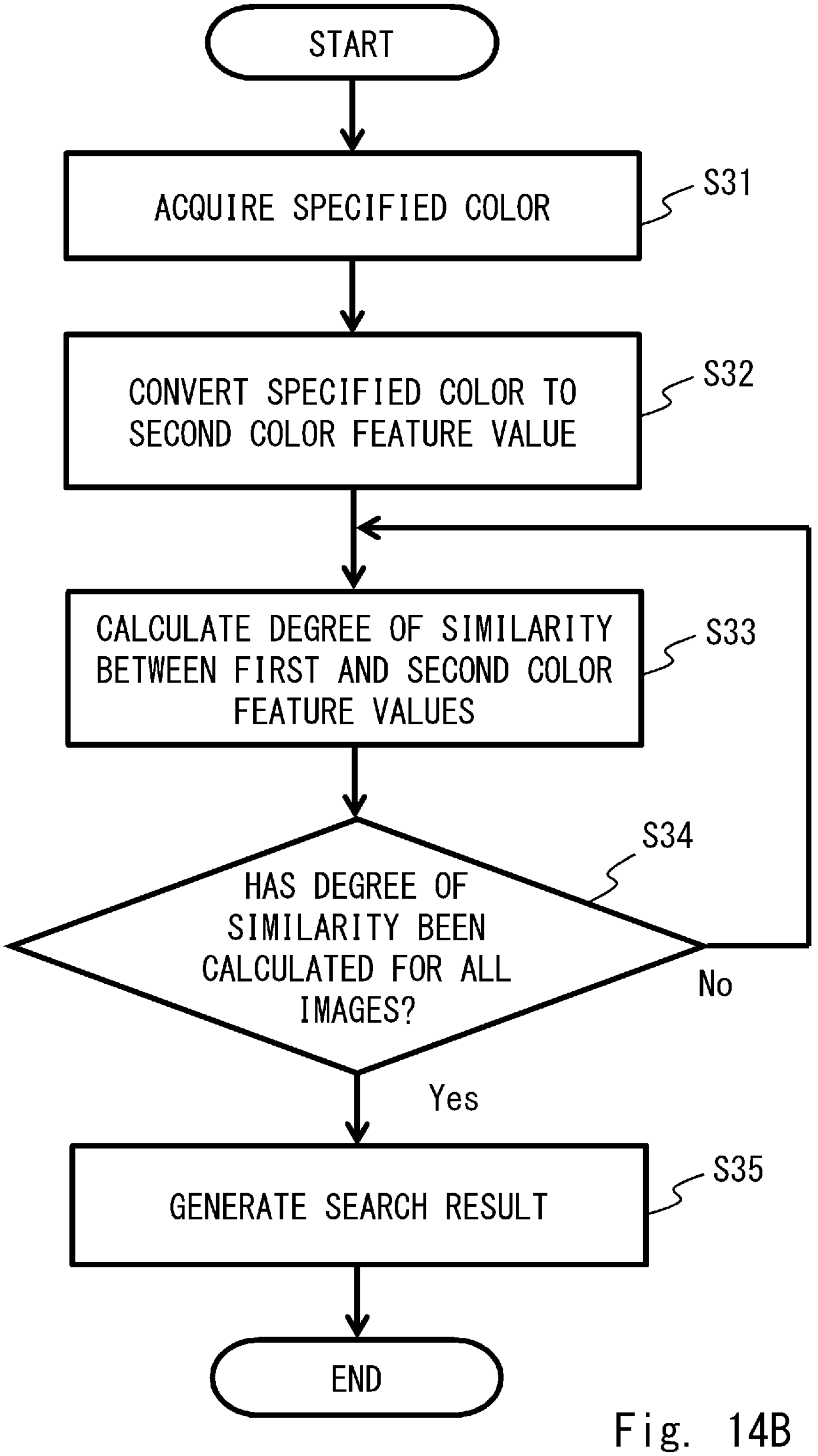
FIG. 14B is a flowchart showing an example of a process performed by the color determination apparatus according to the second example embodiment.

FIGS. 14A and 14B are flowcharts showing examples of a representative process performed by the color determination apparatus 20. These flowcharts illustrate a series of processes performed by the color determination apparatus 20. Details of the process or processes executed by each unit are as described above, and thus omissions will be made as appropriate.

First, a process, shown in FIG. 14A, performed before the color determination apparatus 20 calculates the degree of similarity will be described. First, the color space information retrieving unit 21 of the color determination apparatus 20 retrieves color space information from the storage unit 26 (step S21). Next, based on the color space information that the color space information retrieving unit 21 has retrieved, the color feature value extracting unit 22 extracts, from an image stored in the storage unit 26, a first color feature value, which is a feature value with regard to a color of that image (step S22).

The color feature value extracting unit 22 then determines whether a first color feature value has been extracted from all the images from which a color feature value is to be extracted (step S23). This "all the images from which a color feature value is to be extracted" may be, for example, of the images stored in the storage unit 26, images that a user has designated in advance or all the images stored in the storage unit 26.

If a first color feature value has not been extracted from all the images from which a color feature value is to be extracted (No at step S23), the color feature value extracting unit 22 executes the process at step S22 and thereafter again on, among the images from which a color feature value is to be extracted, an image from which a first color feature value has not been extracted. Meanwhile, if a first color feature value has been extracted from all the images from which a color feature value is to be extracted (Yes at step S23), the color feature value extracting unit 22 terminates the process.

Next, a process, shown in FIG. 14B, of calculating the degree of similarity and generating a search result by the color determination apparatus 20 will be described. First, the specified color converting unit 23 of the color determination apparatus 20 acquires a specified color that a user has specified to search for an image (step S31). Based on the position of the acquired specified color in the HSV color space, the specified color converting unit 23 selects a probability distribution model to be employed, by use of the table shown in FIG. 8. Then, by use of the selected probability distribution model, the specified color converting unit 23 converts the specified color to a second color feature value, which is a feature value with regard to that specified color (step S32).

The degree of similarity calculating unit 24 calculates the degree of similarity between the second color feature value obtained at step S32 and the first color feature value extracted at step S22 (step S33). After calculating the degree of similarity, the degree of similarity calculating unit 24 determines whether the degree of similarity has been calculated for all the images for which a search result is to be generated (step S34). This "all the images for which a search result is to be generated" may be, for example, of the images stored in the storage unit 26, images designated as a search target when a user specifies a specified color or all the stored images.

If the degree of similarity has not been calculated for all the images for which a search result is to be generated (No at step S34), the degree of similarity calculating unit 24 executes again the process at step S33 and thereafter on, among the images for which a search result is to be generated, an image for which the degree of similarity has not been calculated. Meanwhile, if the degree of similarity has been calculated for all the images for which a search result is to be generated (Yes at step S34), the degree of similarity calculating unit 24 terminates the calculation process. Then, the image searching unit 25 generates an image search result based on the degree of similarity of each image that the degree of similarity calculating unit 24 has calculated (step S35).

Description of Advantageous Effects

In the manner described above, as with the color determination apparatus 10 according to the first example embodiment, the color determination apparatus 20 can accurately determine a color of an image with the ambiguity in human perception of colors taken into consideration.

When the apparatus searches for an image by a specified color that a user has specified, the user needs to select one or more specified colors from a color space defined in advance. At this point, due to the influences of the environment, such as the size of the color space, the display that displays the colors, or the surrounding illumination, ambiguity arises in colors that humans visually perceive. This poses a problem consisting in the difficulty of accurately selecting, from a color space, a color matching the color of the image that the user desires.

For example, in the RGB color space, each value of RGB can take 256 values, which makes it possible to express about 17,000,000 kinds of colors. In contrast, the number of colors that human eyes can identify is said to be about a few millions, and thus it is different for a human to accurately identify different colors expressed in the RGB color space.

For such a reason, when there is a gap between one or more colors that a user has specified and a color in an image that the user visually perceives, the user needs to specify, into an apparatus, one or more various colors repeatedly and try a search until the user finds a desired image. Therefore, there has been a problem that a search takes a good deal of time and labor.

In contrast, according to this disclosure, the ambiguity of colors that humans visually perceive is expressed by a probability distribution model, and thus the color determination apparatus 20 can present not only an image of a specified color but also an image of a similar color with colors similar to the specified color taken into consideration in the calculation. Therefore, an image that a user desires can be found more easily, and the user can be saved from too much of tedious work.

The color determination apparatus 20 can be used in any applications aimed to identify an image having a specified color or a color similar to the specified color. For example, the color determination apparatus 20 can extract, from a large amount of video data of a monitoring camera, an image capturing a person wearing clothes that have a user's specified color. Therefore, the color determination apparatus 20 can be applied for use, for example, in crime prevention purposes or security purposes.

Furthermore, the color determination apparatus 20 further includes the image searching unit 25 that generates an image search result based on the degree of similarity. Therefore, a user can check an image search result considered to include a specified color. In particular, the degree of similarity calculating unit 24 can calculate the degree of similarity for each of a plurality of images, and the image searching unit 25 can generate a search result based on the calculated degrees of similarity. Therefore, a user can check the image search result considered to include a specified color among a plurality of (in particular, a large number of) images.

Furthermore, when the total of feature values at each of the bins in a color space in first color feature values corresponding to each of the bins in the color space having a feature value of no lower than a threshold η in the second color feature value is lower than 0 (first threshold), the degree of similarity calculating unit 24 performs the calculation by multiplying the degree of similarity by the parameter D1, which reduces the degree of similarity sim(o,q) as compared to a case in which the total of the feature values is no lower than 0. Therefore, the color determination apparatus 20 can suppress a situation in which a higher degree of similarity is calculated depending on the color serving as noise included in an image for which the degree of similarity is to be determined.

Furthermore, a user can set the threshold θ via an input unit of the color determination apparatus 20. Therefore, the color determination apparatus 20 can make it easier to present, as a search result, an image that the user desires, based on the user's setting.

Furthermore, the specified color converting unit 23 can change the probability distribution model being used in accordance with a specified color. In other words, the specified color converting unit 23 can change the target color and its probability distribution in accordance with the visual characteristics of the specified color, and thus the degree of similarity calculating unit 24 can more easily calculate a higher degree of similarity for an image having coloration close to the coloration of the specified color. Therefore, the color determination apparatus 20 can make it easier to present an image that the user desires as a search result.

Furthermore, the specified color converting unit 23 can convert a specified color to a second color feature value by use of a probability distribution model in a case where the probability distribution of the specified color has a maximum value. Therefore, the degree of similarity calculating unit 24 can calculate a higher degree of similarity for an image that includes the specified color than for an image that includes a target color. Therefore, the color determination apparatus 20 can make it easier to present an image that the user desires as a search result.

Furthermore, the color space information that the color space information retrieving unit 21 retrieves may be color space information that defines an HSV color space. According to the second example embodiment, although the color space information may be for, for example but not limited to, an HLS color space, an RGB color space, or a CMTK color space, the HSV color space, by its design, has advantages in that a function of a probability distribution model is easier to define or in that the user can more easily specify a specified color intuitively.

The specified color converting unit 23 can divide the HSV color space into Area 1 of black (first area) where Value V is lower than 0.19, Area 2 of gray (second area) where Value V is no lower than 0.19 nor higher than 0.81 and Saturation S is lower than 0.14, Area 3 of white (third area) where Value V is higher than 0.81 and Saturation S is lower than 0.14, and Area 4 of other colors (fourth area). Then, based on which of the areas a specified color belongs to, the specified color converting unit 23 can change the probability distribution model being used. Therefore, the degree of similarity calculating unit 24 can more easily calculate a higher degree of similarity for an image having coloration close to the coloration of the specified color, and thus the color determination apparatus 20 can make it easier to present an image that the user desires as a search result. Furthermore, this method of dividing the color space matches how a user perceives coloration, and the calculation result of the degree of similarity by the degree of similarity calculating unit 24 that is based on this dividing method corresponds to the perception of the user.

Herein, for areas other than the area which the specified color belongs to in each area of the HSV color space, the specified color converting unit 23 can set the feature value (probability) of the second color feature value to 0. Therefore, the degree of similarity calculating unit 24 can calculate, to be 0, the degree of similarity of an image that includes only a color or colors that are not similar to the specified color, and thus a target image that serves as noise in the user's search can be identified accurately.

Furthermore, the probability distribution model may be expressed in Gaussian, and the standard deviation to be used in the Gaussian in at least one area among the areas may be different from the standard deviation to be used in the Gaussian in the other areas. Therefore, the specified color converting unit 23 can change the probability distribution of a target color in accordance with the coloration of the specified color, and thus the degree of similarity calculating unit 24 can more easily calculate a higher degree of similarity for an image having coloration close to the coloration of the specified color. Therefore, the color determination apparatus 20 can make it easier to present an image that the user desires as a search result.

Third Example Embodiment

A third example embodiment of this disclosure will be described below. According to the third example embodiment, a main variation of the second example embodiment will be described.

[Description of Configuration]

Figure 15:
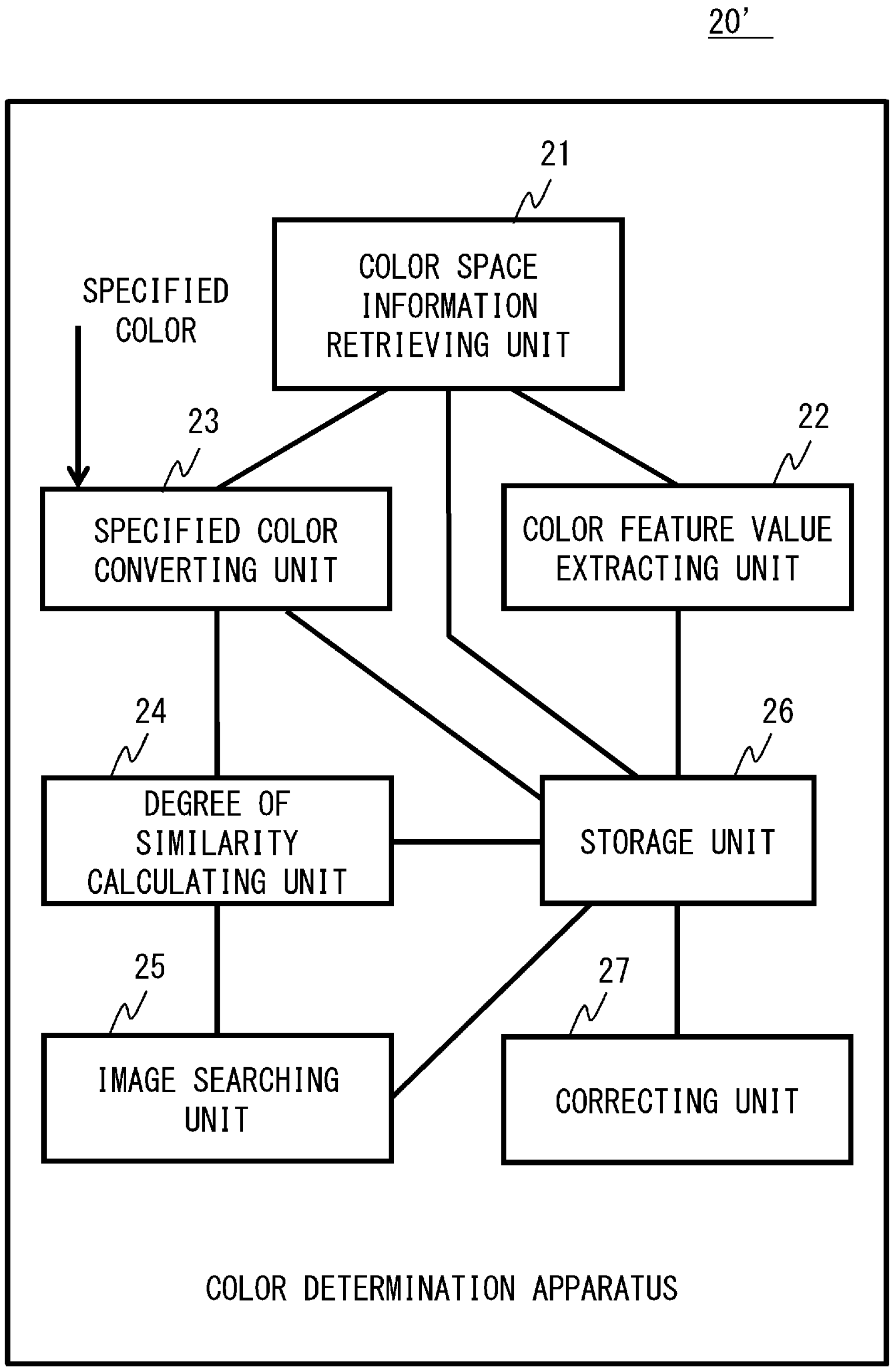
FIG. 15 is a block diagram showing one example of a color determination apparatus according to a third example embodiment.

FIG. 15 is a block diagram showing one example of a color determination apparatus 20 according to the third example embodiment. In comparison to the color determination apparatus 20 according to the second example embodiment, a color determination apparatus 20' further includes a correcting unit 27.

As described according to the second example embodiment, the image searching unit 25 generates each image search result based on a calculation result of the degree of similarity calculating unit 24. Then, the image searching unit 25 causes an image according to the search result to be displayed on a display unit of the color determination apparatus 20'. At this point, a user selects one or more desired images from the displayed images by use of an input unit.

At this point, the color determination apparatus 20' stores, as evaluation data into the storage unit 26, the search result or the degree of similarity of a plurality of images that the degree of similarity calculating unit 24 has calculated and the image or images that the user has selected from the search result with the search result or the degree of similarity linked to the selected image or images. Then, the correcting unit 27 corrects the probability distribution model by use of the stored evaluation data.

The correcting unit 27 can correct each probability distribution model in each of the four areas of the HSV color space through, for example, machine learning. The correcting unit 27 may correct the standard deviation of the Gaussian in Areas 1 to 3 and correct at least one of the standard deviation or the method of giving a penalty in Area 4 of other colors. Instead of or in addition to correcting the probability distribution model, the correcting unit 27 may correct the method of calculating the degree of similarity used by the degree of similarity calculating unit 24. For example, the correcting unit 27 may correct at least either one of D1 and D2 described above in each of the four areas.

With the configuration described above, when the degree of similarity calculating unit 24 recalculates the degree of similarity by use of the specified color of the image that the user has selected, at least either a higher degree of similarity may be calculated for that image or a lower degree of similarity may be calculated for an image other than that image. The correcting unit 27 corrects the probability distribution model in this manner. Preferably, the correcting unit 27 can correct the probability distribution model such that the highest degree of similarity is calculated for the image that the user has selected, as compared to the other images for which the degree of similarity is to be calculated.

When the account for search is set for each user in the color determination apparatus 20', the correcting unit 27 may correct, for each user, at least either one of the probability distribution model or the method of calculating the degree of similarity. Thus, the correcting unit 27 can make a correction reflecting the difference in how colors are perceived by different users.

[Description of Process]

Figure 16:
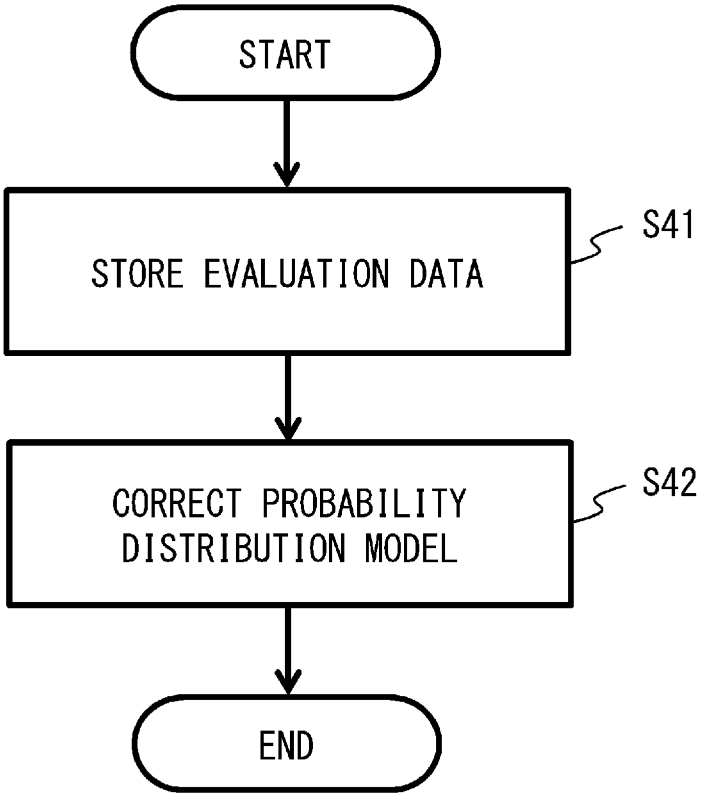
FIG. 16 is a flowchart showing an example of a process performed by the color determination apparatus according to the third example embodiment.

FIG. 16 is a flowchart showing one example of a representative process performed by the color determination apparatus 20'. This flowchart illustrates a series of processes performed by the color determination apparatus 20'. Herein, description of processes described according to the second example embodiment will be omitted.

First, the color determination apparatus 20' stores, as evaluation data into the storage unit 26, a search result of the degree of similarity calculating unit 24 or the degree of similarity of a plurality of images and an image that a user has selected from the search result with the search result or the degree of similarity linked to the selected image (step S41). The correcting unit 27 corrects the probability distribution model by use of the stored evaluation data (step S42). Herein, at step S42, the correcting unit 27 may correct the method of calculating the degree of similarity. Furthermore, the process at step S42 may be executed, for example, when evaluation data of a predetermined number or more of samples has been accumulated for each of the four or more areas or for each user.

Description of Advantageous Effects

With the configuration described above, the correcting unit 27 can correct the probability distribution model by use of the evaluation data such that the image matching the user's specified color is shown higher in the search result. Therefore, in the future search, the user can visually recognize that his or her desired image is ranked higher in the search result at a higher probability.

It is to be noted that this disclosure is not limited by the foregoing example embodiments, and modifications can be made as appropriate within the scope that does not depart from the and spirit. For example, although, in the example illustrated according to the second example embodiment, the numerical values 0.14, 0.19, and 0.81 are used as the thresholds for dividing the HSV color space into the four areas, other numerical values may be used as the thresholds. Furthermore, the threshold of Saturation S for dividing Area 2 and Area 4 may be the maximum value of Saturation S (i.e., the value of Saturation S for the lightest black) when Value V is 0.19. Furthermore, the fifth threshold of Saturation S for dividing Area 3 and Area 4 may be different from the fourth threshold of Saturation S for dividing Area 2 and Area 4. For example, for the purpose of setting a stricter determination standard for white than for gray, the fifth threshold may be set lower than the fourth threshold. Furthermore, the fifth threshold may be the maximum value of Saturation S when Value V is 0.19.

As a function of the probability distribution model described above, a normal distribution, which is a type of Gaussian, can also be used. Other than Gaussian, any window function of a tent shape may be employed as a function of the probability distribution model. For example, non-exhaustive examples of functions that can be employed include a Gaussian window other than a normal distribution, a triangular window, a Parzen window, a Welch window, a Sine window, a general Cosinea window, such as a Hann window, and a kaiser window.

According to the second example embodiment, the color feature value extracting unit 22 does not need to normalize a two-dimensional array obtained as a final result. In this case, the degree of similarity calculating unit 24 executes the normalization, if necessary, when calculating the degree of similarity. Thus, the image searching unit 25 can generate a search result appropriately reflecting the magnitude of the degree of similarity between images.

A user can specify not only one color but also a plurality of colors as a specified color. In this case as well, the color determination apparatus 10 or 20 calculates the degree of similarity between the image and the specified color by executing the processes described above.

For example, when two colors are specified as the specified color according to the second example embodiment, the specified color converting unit 23 derives the second feature value of each of the specified colors as described above. Then, the specified color converting unit 23 adds these two feature values of the corresponding bins in the two-dimensional array and normalizes the two-dimensional array after the addition process to thus derive the second feature value of the combined color. Thereafter, the degree of similarity calculating unit 24 calculates the degree of similarity between the second feature value of that combined color and the first feature value of each image. In this manner, the color determination apparatus 20 can calculate the degree of similarity between the image and the specified color.

Although the two specified colors have the same weight in the example described above, the two specified color may have different weights through the specification by the user. For example, when the main colors of the image that the user desires are 70% red and 30% black, the user inputs, into the color determination apparatus 20 via an input unit, information indicating that the weight of "red," which is a first specified color, is 7 and the weight of "black," which is a second specified color is 3. By use of these weights, the specified color converting unit 23 adds the second feature value of "red" and the second feature value of "black" at a ratio of 7:3 and then normalizes the two-dimensional array after the addition process to thus derive the second feature value of the combined color. The degree of similarity calculating unit 24 calculates the degree of similarity by use of the second feature value of this combined color. With the configuration described above, the degree of similarity calculating unit 24 can calculate a higher degree of similarity for an image having coloration close to the coloration of the image that the user remembers. As a result, the image searching unit 25 can present an image that the user desires at a higher probability. The process described above can also be implemented with three or more specified colors.

In the example embodiments illustrated thus far, this disclosure has been described as a configuration of hardware, but this disclosure is not limited by that description.

According to this disclosure, the processes (steps) of the color determination apparatus described in the foregoing example embodiments can also be implemented as a processor in a computer is caused to execute a computer program.

Figure 17:
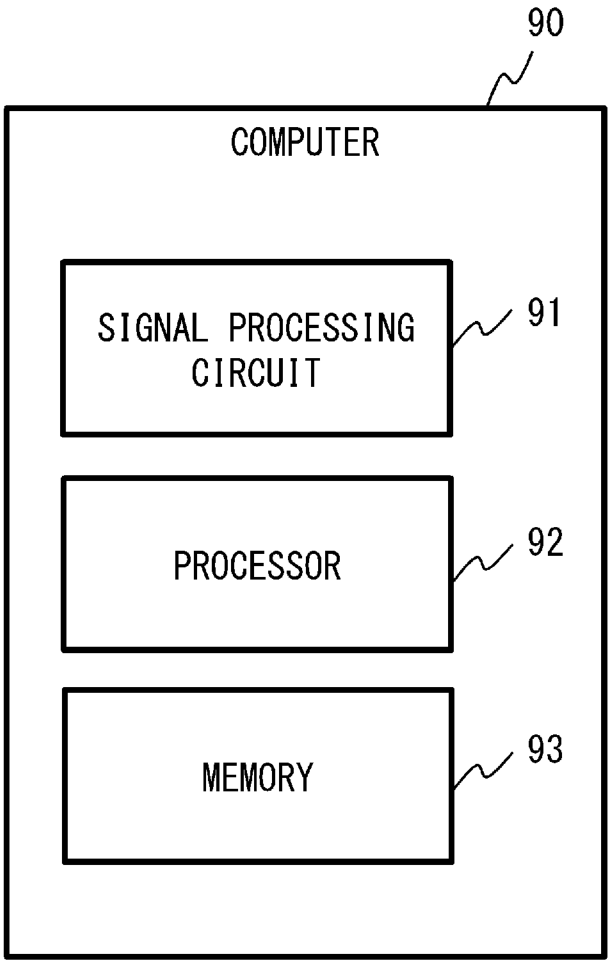
FIG. 17 is a block diagram showing one example of a hardware configuration of an apparatus according to each of the example embodiments.

FIG. 17 is a block diagram showing an example of a hardware configuration of an information processing apparatus (signal processing apparatus) in which the processes of each of the foregoing example embodiments are executed. With reference to FIG. 17, this information processing apparatus 90 includes a signal processing circuit 91, a processor 92, and a memory 93.

The signal processing circuit 91 is a circuit for processing a signal in accordance with the control of the processor 92. Herein, the signal processing circuit 91 may include a communication circuit that receives a signal from a transmitter device.

The processor 92 reads out software (computer program) from the memory 93 and executes the software and thus performs the processes of the apparatus described according to the foregoing example embodiments. As one example of the processor 92, one selected from a central processing unit (CPU), a microprocessing unit (MPU), a field-programmable gate array (FPGA), a demand-side platform (DSP), an application specific integrated circuit (ASIC) may be used, or some of the above may be used in parallel.

The memory 93 is constituted by a volatile memory, a non-volatile memory, or a combination thereof. It is not a limitation that a single memory 93 be provided, and a plurality of memories 93 may be provided. Examples of a volatile memory may include a random-access memory (RAM), such as a dynamic random-access memory (DRAM) or a static random-access memory (SRAM). Examples of a non-volatile memory may include a random-only memory (ROM), such as a programmable random-only memory (PROM) or an erasable programmable read-only memory (EPROM), a flash memory, and a solid-state drive (SSD).

The memory 93 is used to store one or more instructions. Herein, the one or more instructions are stored in the memory 93 as a set of software modules. The processor 92 can perform the processes described according to the foregoing example embodiments by reading out this set of software modules from the memory 93 and executing the set of software modules.

The memory 93 may include, in addition to a memory provided outside the processor 92, a memory built in the processor 92. The memory 93 may include a storage disposed apart from a processor constituting the processor 92. In this case, the processor 92 can access the memory 93 via an input/output (I/O) interface.

As described above, one or more processors of each apparatus according to the foregoing example embodiments execute one or more programs including a set of instructions that causes a computer to perform the algorithms described with reference to the drawings. Through this process, the signal processing method described according to each of the example embodiments can be implemented.

A program includes a set of instructions (or software codes) that, when loaded onto a computer, causes the computer to execute one or more functions described according the example embodiments. The program may be stored in a non-transitory computer-readable medium or in a tangible storage medium. As some non-limiting examples, a computer-readable medium or a tangible storage medium includes a random-access memory (RAM), a read-only memory (ROM), a flash memory, a solid-state drive (SSD), or other memory technologies; a CD-ROM, a digital versatile disc (DVD), a Blu-ray (registered trademark) disc, or other optical disc storages; or a magnetic cassette, a magnetic tape, a magnetic disk storage, or other magnetic storage devices. A program may be transmitted via a transitory computer-readable medium or via a communication medium. As some non-limiting examples, a transitory computer-readable medium or a communication medium includes an electrical, optical, or acoustic propagation signal or a propagation signal of any other form.

Part or the whole of the foregoing example embodiments can be expressed also as in the following supplementary notes, which are not limiting.

(Supplementary Note 1)

A color determination apparatus comprising:

color feature value extracting means configured to extract a first color feature value from an image based on color space information defining a color space, the first color feature value being a feature value with regard to a color of the image;

specified color converting means configured to convert a user's specified color to a second color feature value based on the color space information and a probability distribution model expressing color ambiguity, the second color feature value being a feature value with regard to the specified color; and degree of similarity calculating means configured to calculate a degree of similarity between the first color feature value and the second color feature value.

(Supplementary Note 2)

The color determination apparatus according to Supplementary Note 1, further comprising image searching means configured to generate an image search result based on the degree of similarity.

(Supplementary Note 3)

The color determination apparatus according to Supplementary Note 2, wherein the color feature value extracting means is configured to extract the first color feature value from each of a plurality of images, the degree of similarity calculating means is configured to calculate the degree of similarity for the each of the plurality of images, and the image searching means is configured to generate the search result based on the degree of similarity of the each of the plurality of images.

(Supplementary Note 4)

The color determination apparatus according to Supplementary Note 3, further comprising:

storage means configured to store, as evaluation data, the search result or the degree of similarity of the each of the plurality of images and the image that the user has selected from the search result with the search result or the degree of similarity linked to the image; and correcting means configured to correct, by use of the evaluation data, at least either one of the probability distribution model or a degree of similarity calculating method of the degree of similarity calculating means.

(Supplementary Note 5)

The color determination apparatus according to any one of Supplementary Notes 1 to 4, wherein the color feature value extracting means is configured to extract, as the first color feature value, a feature value at each bin in the color space concerning the color of the image, the specified color converting means is configured to extract, as the second color feature value, a feature value at each bin in the color space concerning the specified color and a color similar to the specified color, and the degree of similarity calculating means is configured to, when a total of feature values at each bin in the color space in the first color feature value corresponding to each bin in the color space having a feature value of no lower than a threshold in the second color feature value is lower than a first threshold, perform a calculation by multiplying the degree of similarity by a parameter that reduces the degree of similarity as compared to a case in which the total of the feature values is no lower than the first threshold.

(Supplementary Note 6)

The color determination apparatus according to Supplementary Note 5, further comprising setting means configured to allow the user to set the first threshold.

(Supplementary Note 7)

The color determination apparatus according to any one of Supplementary Notes 1 to 6, wherein the specified color converting means is configured to change the probability distribution model being used in accordance with the specified color.

(Supplementary Note 8)

The color determination apparatus according to any one of Supplementary Notes 1 to 7, wherein the specified color converting means is configured to convert the specified color to the second color feature value by use of the probability distribution model where in a case a probability of the specified color has a maximum value.

(Supplementary Note 9)

The color determination apparatus according to any one of Supplementary Notes 1 to 8, wherein the color space information defines an HSV color space.

(Supplementary Note 10)

The color determination apparatus according to Supplementary Note 9, wherein the specified color converting means is configured to divide the HSV color space into a first area where a Value value is lower than a second threshold, a second area where the Value value is no lower than the second threshold nor higher than a third threshold and a Saturation value is lower than a fourth threshold, a third area where the Value value is higher than the third threshold and the Saturation value is lower than a fifth threshold, and a fourth area other than the first, second, and third areas, and to change the probability distribution model being used based on which one of the first to fourth areas the specified color belongs to.

(Supplementary Note 11)

The color determination apparatus according to Supplementary Note 10, wherein the specified color converting means is configured to set the feature value in the second color feature value to 0 in an area other than an area which the specified color belongs to in the first to fourth areas.

(Supplementary Note 12)

The color determination apparatus according to Supplementary Note 10 or 11, wherein the probability distribution model is expressed by Gaussian, and a standard deviation to be used in the Gaussian in at least one area of the first to fourth areas is different from a standard deviation to be used in the Gaussian in the other areas.

(Supplementary Note 13)

A color determination method to be executed by a color determination apparatus, the color determination method comprising:

extracting a first color feature value from an image based on color space information defining a color space, the first color feature value being a feature value with regard to a color of the image;

converting a user's specified color to a second color feature value based on the color space information and a probability distribution model expressing color ambiguity, the second color feature value being a feature value with regard to the specified color; and calculating a degree of similarity between the first color feature value and the second color feature value.

(Supplementary Note 14)

A non-transitory computer-readable medium storing a program that causes a computer to execute:

extracting a first color feature value from an image based on color space information defining a color space, the first color feature value being a feature value with regard to a color of the image;

converting a user's specified color to a second color feature value based on the color space information and a probability distribution model expressing color ambiguity, the second color feature value being a feature value with regard to the specified color; and calculating a degree of similarity between the first color feature value and the second color feature value.

Thus far, this disclosure has been described with reference to the example embodiments, but this disclosure is not limited by the above. Various modifications that a person skilled in the art can appreciate can be made to the configuration and details of this disclosure within the scope of this disclosure.

REFERENCE SIGNS LIST

10 COLOR DETERMINATION APPARATUS
11 COLOR FEATURE VALUE EXTRACTING UNIT
12 SPECIFIED COLOR CONVERTING UNIT
13 DEGREE OF SIMILARITY CALCULATING UNIT
20, 20' COLOR DETERMINATION APPARATUS
21 COLOR SPACE INFORMATION RETRIEVING UNIT
22 COLOR FEATURE VALUE EXTRACTING UNIT
23 SPECIFIED COLOR CONVERTING UNIT
24 DEGREE OF SIMILARITY CALCULATING UNIT
25 IMAGE SEARCHING UNIT
26 STORAGE UNIT
27 CORRECTING UNIT

What is claimed is:

1. A color determination apparatus comprising:

at least one memory configured to store instructions; and at least one processor configured to execute the instructions to:

for each respective image of a plurality of images, extract a first color feature value from the respective image based on color space information defining a color space, the first color feature value being a feature value with regard to a respective color of the respective image of the plurality of images, wherein extracting the first color feature value from the respective image of the plurality of images includes extracting a feature value at each bin in the color space concerning the respective color of the respective image;

convert a second color specified by a user to a second color feature value based on the color space information, the second color feature value being a feature value with regard to the second color specified by the user, wherein converting the second color specified by the user to the second color feature value includes extracting a feature value at each bin in the color space concerning the second color specified by the user and a color similar to the second color specified by the user;

for each respective image of the plurality of images, calculate a respective degree of similarity between the first color feature value of the respective image and the second color feature value;

generate an image search result based on the respective degrees of similarity corresponding to the plurality of images;

store the image search result or the respective degrees of similarity corresponding to the plurality of images, and an image that the user has selected from the search result, as evaluation data;

correct, by use of the evaluation data, a probability distribution model expressing color ambiguity;

convert a third color specified by the user to a third color feature value based on the color space information and the corrected probability distribution model, the third color feature value being a feature value with regard to the third color specified by the user; and for each respective image of the plurality of images, when a total of feature values at each bin in the color space in the first color feature value of the respective image corresponding to each bin in the color space having a feature value of no lower than a threshold in the second color feature value is lower than a first threshold, perform a calculation by multiplying the respective degree of similarity by a parameter that reduces the respective degree of similarity so that it is less than a degree of similarity in a case in which the total of the feature values is no lower than the first threshold.

2. The color determination apparatus according to claim 1, wherein the at least one processor is further configured to, for each respective image of the plurality of images, allow the user to set the first threshold.

3. The color determination apparatus according to claim 1, wherein correcting the probability distribution model expressing color ambiguity includes changing the probability distribution model being used in accordance with the second color specified by the user.

4. The color determination apparatus according to claim 1, wherein converting the second color specified by the user to the second color feature value includes converting the second color specified by the user to the second color feature value using the probability distribution model in a case where a probability of the second specified color has a maximum value.

5. The color determination apparatus according to claim 1, wherein the color space information defines an HSV color space.

6. The color determination apparatus according to claim 5, wherein the at least one processor is further configured to, for each respective image of the plurality of images, divide the HSV color space into a first area where a Value value is lower than a second threshold, a second area where the Value value is no lower than the second threshold nor higher than a third threshold and a Saturation value is lower than a fourth threshold, a third area where the Value value is higher than the third threshold and the Saturation value is lower than a fifth threshold, and a fourth area other than the first, second, and third areas, and to change the probability distribution model being used based on which one of the first to fourth areas the second specified color belongs to.

7. The color determination apparatus according to claim 6, wherein the at least one processor is further configured to, for each respective image of the plurality of images, set the feature value in the second color feature value to 0 in an area other than an area which the second specified color belongs to in the first to fourth areas.

8. The color determination apparatus according to claim 6, wherein the probability distribution model is expressed by Gaussian, and a standard deviation to be used in the Gaussian in at least one area of the first to fourth areas is different from a standard deviation to be used in the Gaussian in the other areas.

9. A color determination method to be executed by a color determination apparatus, the color determination method comprising:

for each respective image of a plurality of images, extracting a first color feature value from the respective image based on color space information defining a color space, the first color feature value being a feature value with regard to a respective color of the respective image of the plurality of images, wherein extracting the first color feature value from the respective image of the plurality of images includes extracting a feature value at each bin in the color space concerning the respective color of the respective image;

converting a second color specified by a user to a second color feature value based on the color space information, the second color feature value being a feature value with regard to the second color specified by the user, wherein converting the second color specified by the user to the second color feature value includes extracting a feature value at each bin in the color space concerning the second color specified by the user and a color similar to the second color specified by the user;

for each respective image of the plurality of images, calculating a respective degree of similarity between the first color feature value of the respective image and the second color feature value;

generating an image search result based on the respective degrees of similarity corresponding to the plurality of images;

storing the image search result or the respective degrees of similarity corresponding to the plurality of images, and an image that the user has selected from the search result, as evaluation data;

correcting, by use of the evaluation data, a probability distribution model expressing color ambiguity;

converting a third color specified by the user to a third color feature value based on the color space information and the corrected probability distribution model, the third color feature value being a feature value with regard to the third color specified by the user; and for each respective image of the plurality of images, when a total of feature values at each bin in the color space in the first color feature value of the respective image corresponding to each bin in the color space having a feature value of no lower than a threshold in the second color feature value is lower than a first threshold, performing a calculation by multiplying the respective degree of similarity by a parameter that reduces the respective degree of similarity so that it is less than a degree of similarity in a case in which the total of the feature values is no lower than the first threshold.

10. The color determination method according to claim 9, the color determination method further comprising, for each respective image of the plurality of images, allowing the user to set the first threshold.

11. The color determination method according to claim 9, wherein correcting the probability distribution model expressing color ambiguity includes changing the probability distribution model being used in accordance with the second color specified by the user.

12. The color determination method according to claim 9, wherein converting the second color specified by the user to the second color feature value includes converting the second color specified by the user to the second color feature value using the probability distribution model in a case where a probability of the second specified color has a maximum value.

13. The color determination method according to claim 9, wherein the color space information defines an HSV color space.

14. A non-transitory computer-readable medium storing a program that causes a computer to execute:

for each respective image of a plurality of images, extracting a first color feature value from the respective image based on color space information defining a color space, the first color feature value being a feature value with regard to a respective color of the respective image of the plurality of images, wherein extracting the first color feature value from the respective image of the plurality of images includes extracting a feature value at each bin in the color space concerning the respective color of the respective image;

converting a second color specified by a user to a second color feature value based on the color space information, the second color feature value being a feature value with regard to the second color specified by the user, wherein converting the second color specified by the user to the second color feature value includes extracting a feature value at each bin in the color space concerning the second color specified by the user and a color similar to the second color specified by the user;

for each respective image of the plurality of images, calculating a respective degree of similarity between the first color feature value of the respective image and the second color feature value;

generating an image search result based on the respective degrees of similarity corresponding to the plurality of images;

storing the image search result or the respective degrees of similarity corresponding to the plurality of images, and an image that the user has selected from the search result, as evaluation data;

correcting, by use of the evaluation data, a probability distribution model expressing color ambiguity;

converting a third color specified by the user to a third color feature value based on the color space information and the corrected probability distribution model, the third color feature value being a feature value with regard to the third color specified by the user; and for each respective image of the plurality of images, when a total of feature values at each bin in the color space in the first color feature value of the respective image corresponding to each bin in the color space having a feature value of no lower than a threshold in the second color feature value is lower than a first threshold, performing a calculation by multiplying the respective degree of similarity by a parameter that reduces the respective degree of similarity so that it is less than a degree of similarity in a case in which the total of the feature values is no lower than the first threshold.

15. The non-transitory computer-readable medium according to claim 14, wherein correcting the probability distribution model expressing color ambiguity includes changing the probability distribution model being used in accordance with the second color specified by the user.

16. The non-transitory computer-readable medium according to claim 14, wherein converting the second color specified by the user to the second color feature value includes converting the second color specified by the user to the second color feature value using the probability distribution model in a case where a probability of the second specified color has a maximum value.

17. The non-transitory computer-readable medium according to claim 14, wherein the color space information defines an HSV color space.

* * * * *